United States Patent
Tuczek

(10) Patent No.: US 9,403,338 B2
(45) Date of Patent: Aug. 2, 2016

(54) FOLDED STRUCTURE, INTERCONNECTION OF ELEMENTS, SANDWICH PANEL, AS WELL AS FOLDING PROCESS AND FOLDING TOOL

(71) Applicant: Florian Tuczek, Leipzig (DE)

(72) Inventor: Florian Tuczek, Leipzig (DE)

(*) Notice: Subject to any disclaimer, the term of this patent is extended or adjusted under 35 U.S.C. 154(b) by 0 days.

(21) Appl. No.: 14/820,576

(22) Filed: Aug. 7, 2015

(65) Prior Publication Data
US 2016/0039164 A1 Feb. 11, 2016

(30) Foreign Application Priority Data

Aug. 9, 2014 (DE) .......................... 10 2014 011 775

(51) Int. Cl.
*B32B 1/00* (2006.01)
*B32B 3/00* (2006.01)
*B31D 3/00* (2006.01)
(Continued)

(52) U.S. Cl.
CPC ........ *B31D 3/005* (2013.01); *B31D 5/04* (2013.01); *B32B 3/12* (2013.01); *B32B 2607/00* (2013.01)

(58) Field of Classification Search
CPC ......... E04C 2/326; E04C 2/328; B31D 3/005; B31D 5/04; B32B 3/12; B32B 2607/00; B32B 3/28; Y10T 428/24661; Y10T 428/24149; Y10T 428/2419; Y10T 428/24215; Y10T 428/24264; Y10T 428/24645; Y10T 156/1015; Y10T 156/1051; E04B 9/0414
USPC ...................................................... 428/174
See application file for complete search history.

(56) References Cited

U.S. PATENT DOCUMENTS 3,698,879 A * 10/1972 Lucien ................... B21D 13/02
210/493.5
5,028,474 A * 7/1991 Czaplicki ............... B31D 3/005
428/116
(Continued)

FOREIGN PATENT DOCUMENTS

DE 2213472 A 10/1972
DE 19944662 C5 6/2001
(Continued)

OTHER PUBLICATIONS

Jochen Pflug, et al., "Folded Honeycombs Fast and continuous production of the core and a reliable core-skin bond", 12th International Conference on Composite Materials, Jul. 5-9, 1999, pp. 1-7.
(Continued)

*Primary Examiner* — Catherine A Simone
(74) *Attorney, Agent, or Firm* — Leydig, Voit & Mayer, Ltd.

(57) ABSTRACT

A three dimensional folded structure, for use in lightweight design and lightweight construction, is folded at regular intervals and cannot be folded flat. The folded structure substantially extends in two directions and includes a small number of folded ply sheets. Each of the ply sheets is formed by an originally planar blank of an initially flat material lying in a zero plane and includes fold lines and polygonal holes disposed at regular distances. Each of the ply sheets is subdivided into a plurality of segments, each in the form of a polygonal planar entity that is, except at a border of the ply sheet, delimited by the fold lines and the border-edge-sections of a respective polygonal hole. Each ply sheet is folded up in two directions. During folding, the holes close into slits. Each slit of one ply-sheet is completely bridged by the other ply-sheet.

17 Claims, 12 Drawing Sheets

(51) Int. Cl.
  *B32B 3/12* (2006.01)
  *B31D 5/04* (2006.01)

(56) References Cited

U.S. PATENT DOCUMENTS

| | | |
|---|---|---|
| 5,400,918 A | 3/1995 | Prodaniuk |
| 6,913,570 B2 | 7/2005 | Kehrle |
| 7,758,487 B2 | 7/2010 | Elsayed et al. |
| 8,647,251 B2 * | 2/2014 | Kling ................. B31D 5/04 493/405 |
| 2010/0227116 A1 | 9/2010 | Leylekian et al. |
| 2011/0281080 A1 | 11/2011 | Levit et al. |

FOREIGN PATENT DOCUMENTS

| | | |
|---|---|---|
| GB | 1390132 A | 4/1975 |
| JP | 3673519 B2 | 7/2005 |
| WO | WO 2009087304 A1 | 7/2009 |

OTHER PUBLICATIONS

Foldcore, "Verbindungstechnik", http://www.foldcore.eu/index.php?option=com_content&view=article&id=70:verbindungstechnik&catid=42:verbindungstechnik&Itemid=70, Jul. 2, 2014, p. 1.

Wonneberger, M., et al., "Innovative Wabensysteme für Leichtbauanwendungen", Dec. 2005, pp. 1-20.

Borit Wabenplatte, http://www.borit.de/produkte/Wabenplatte/wabenplatte.html, May 1, 2014, pp. 1-7.

* cited by examiner

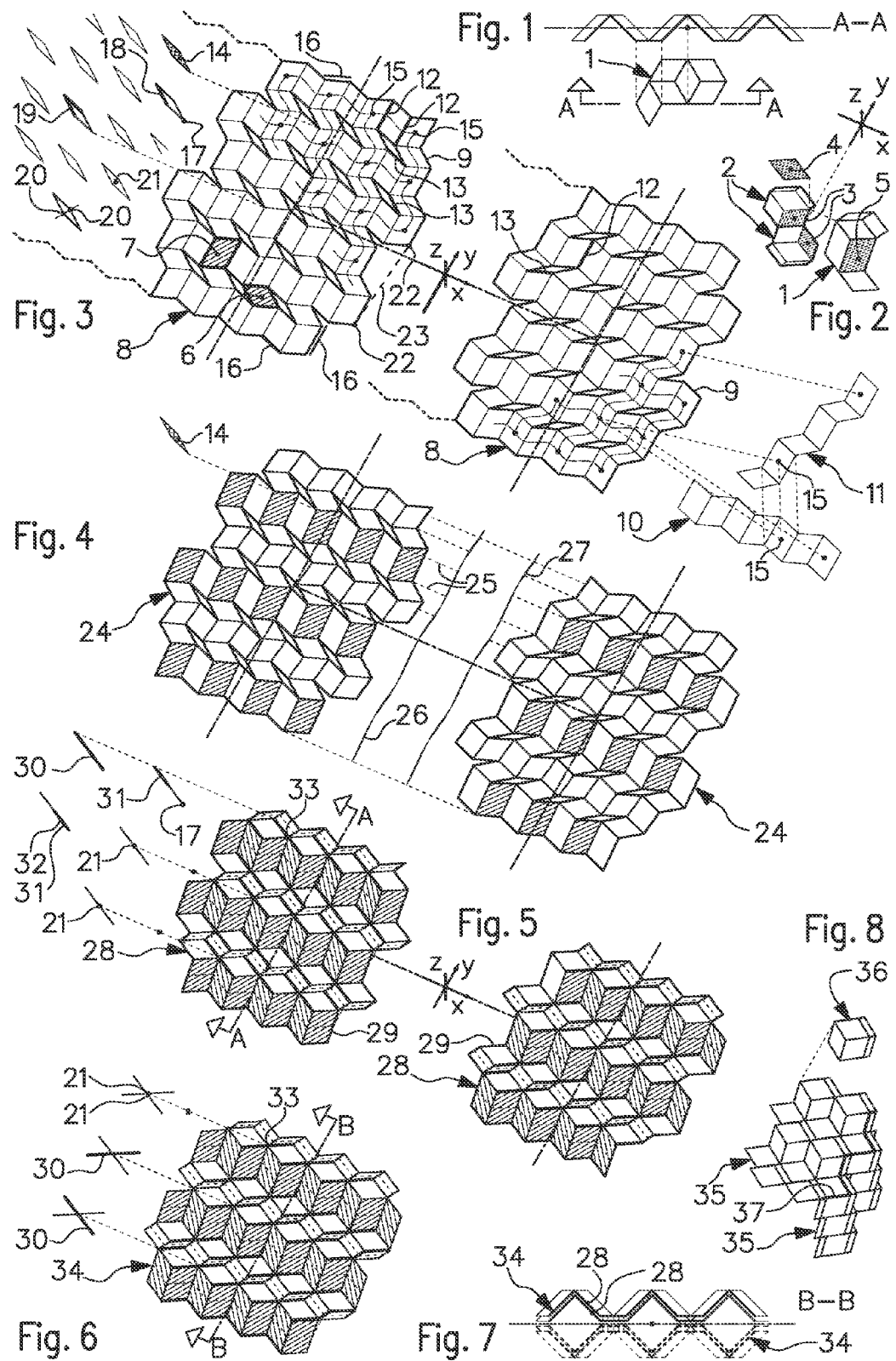

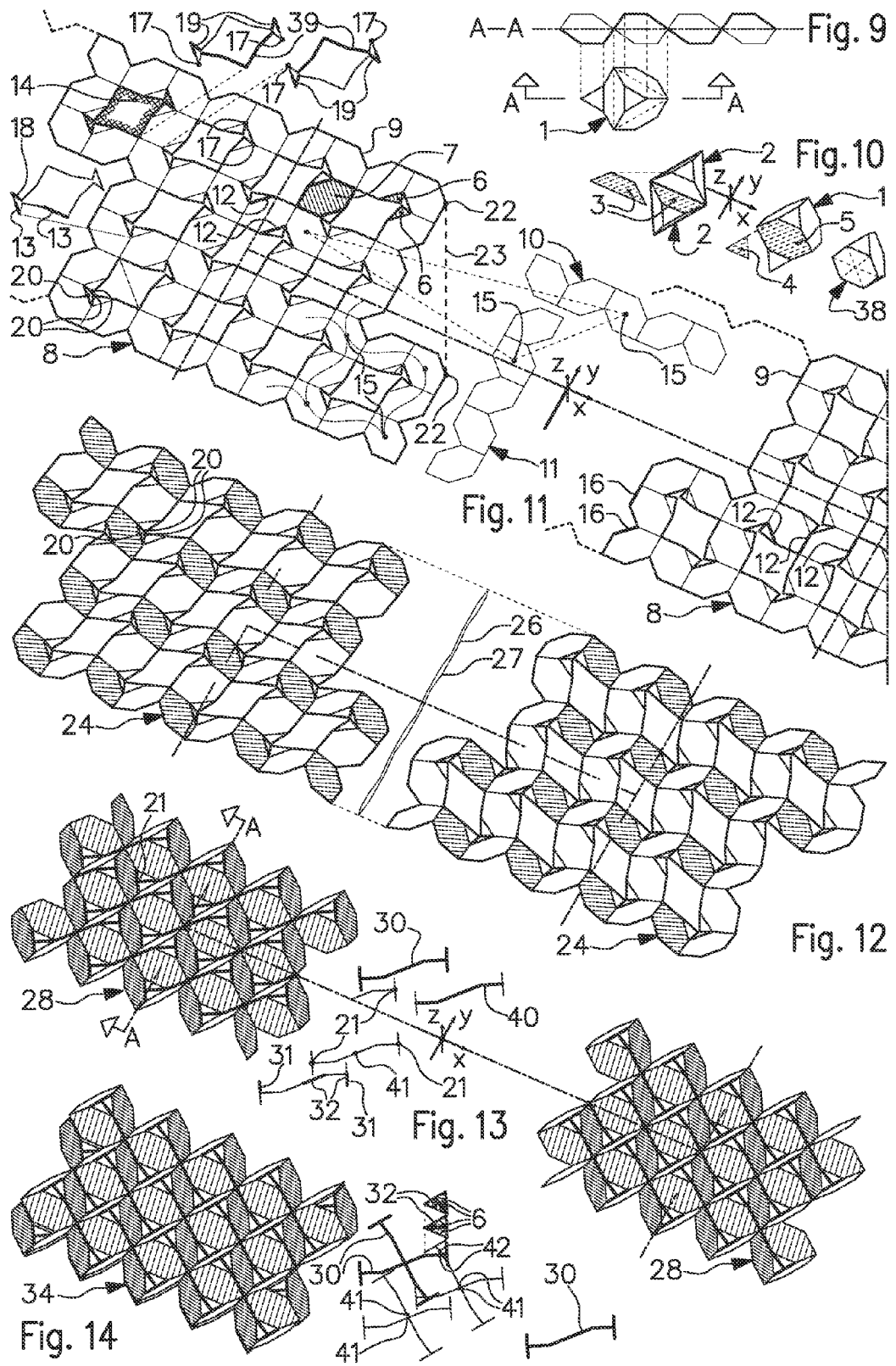

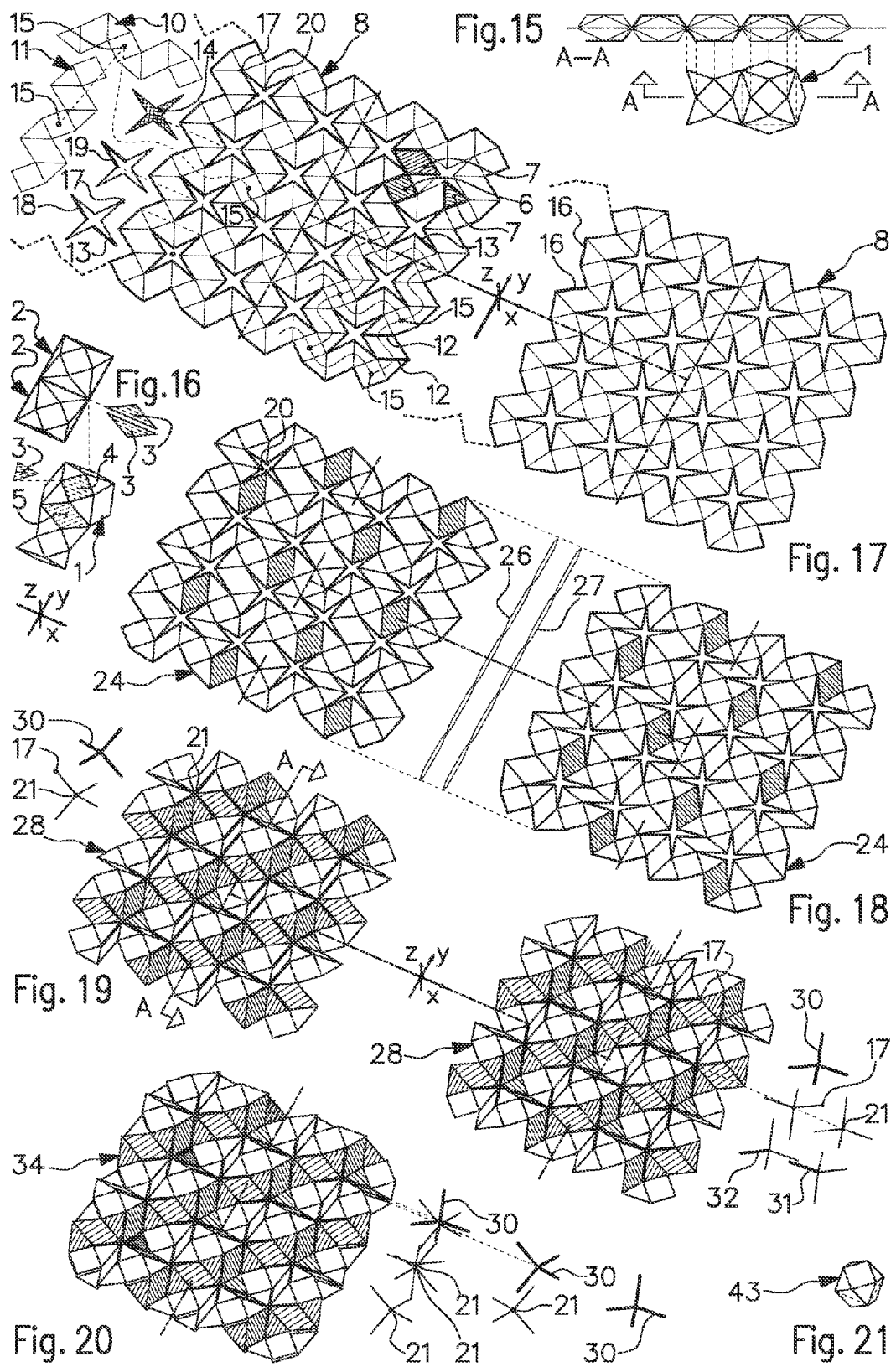

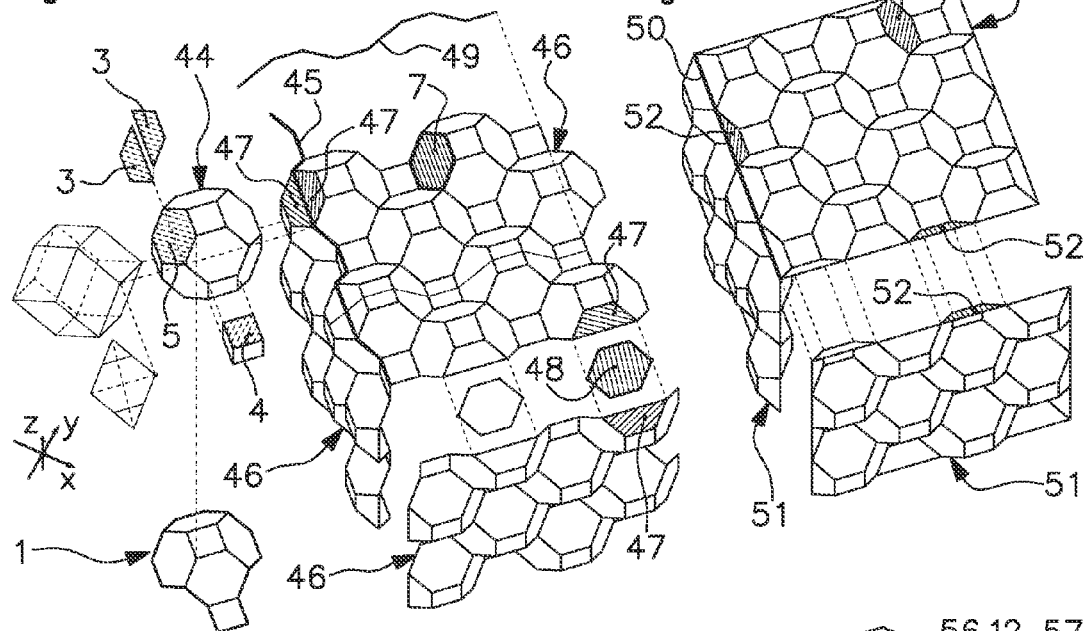

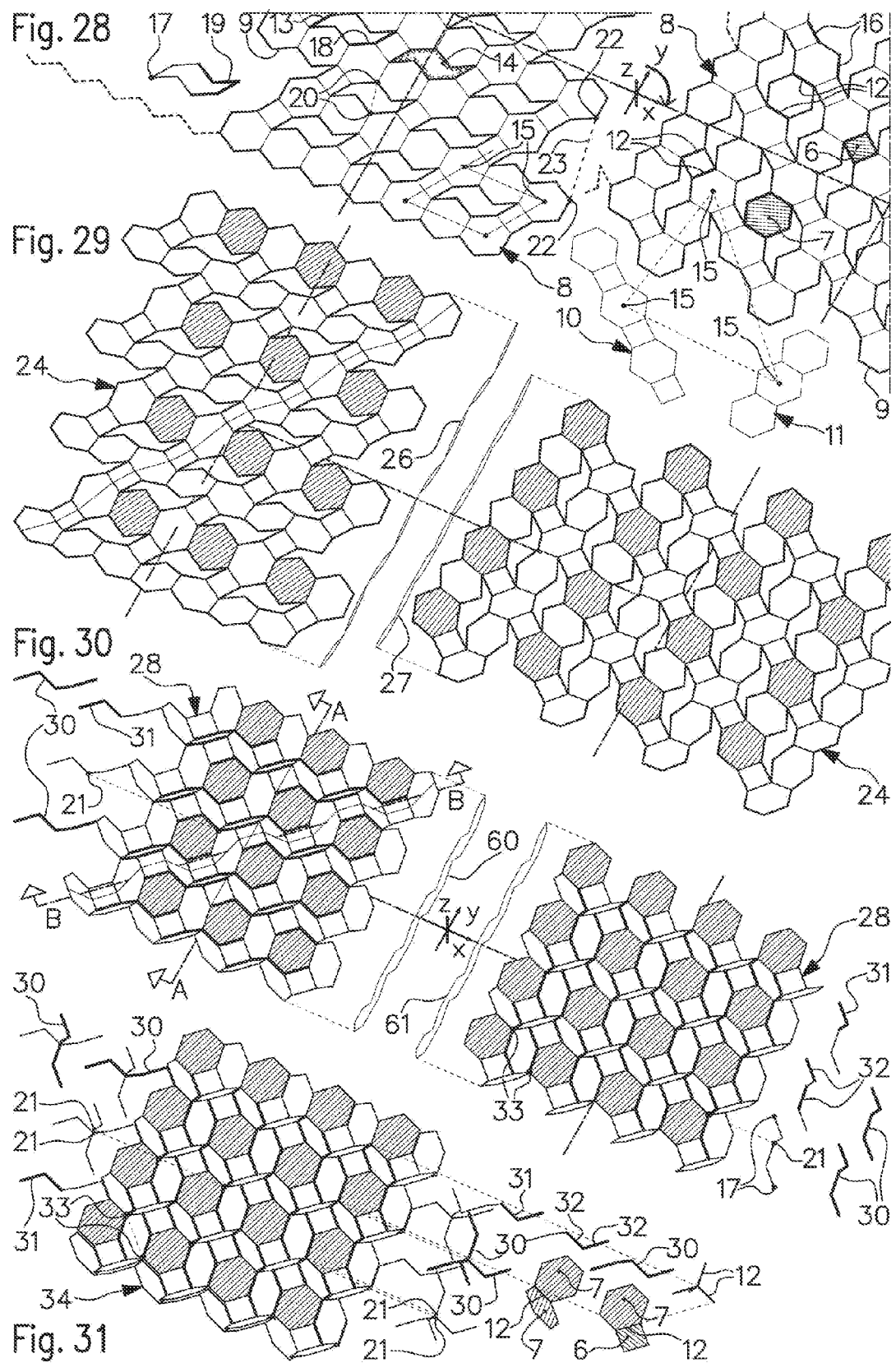

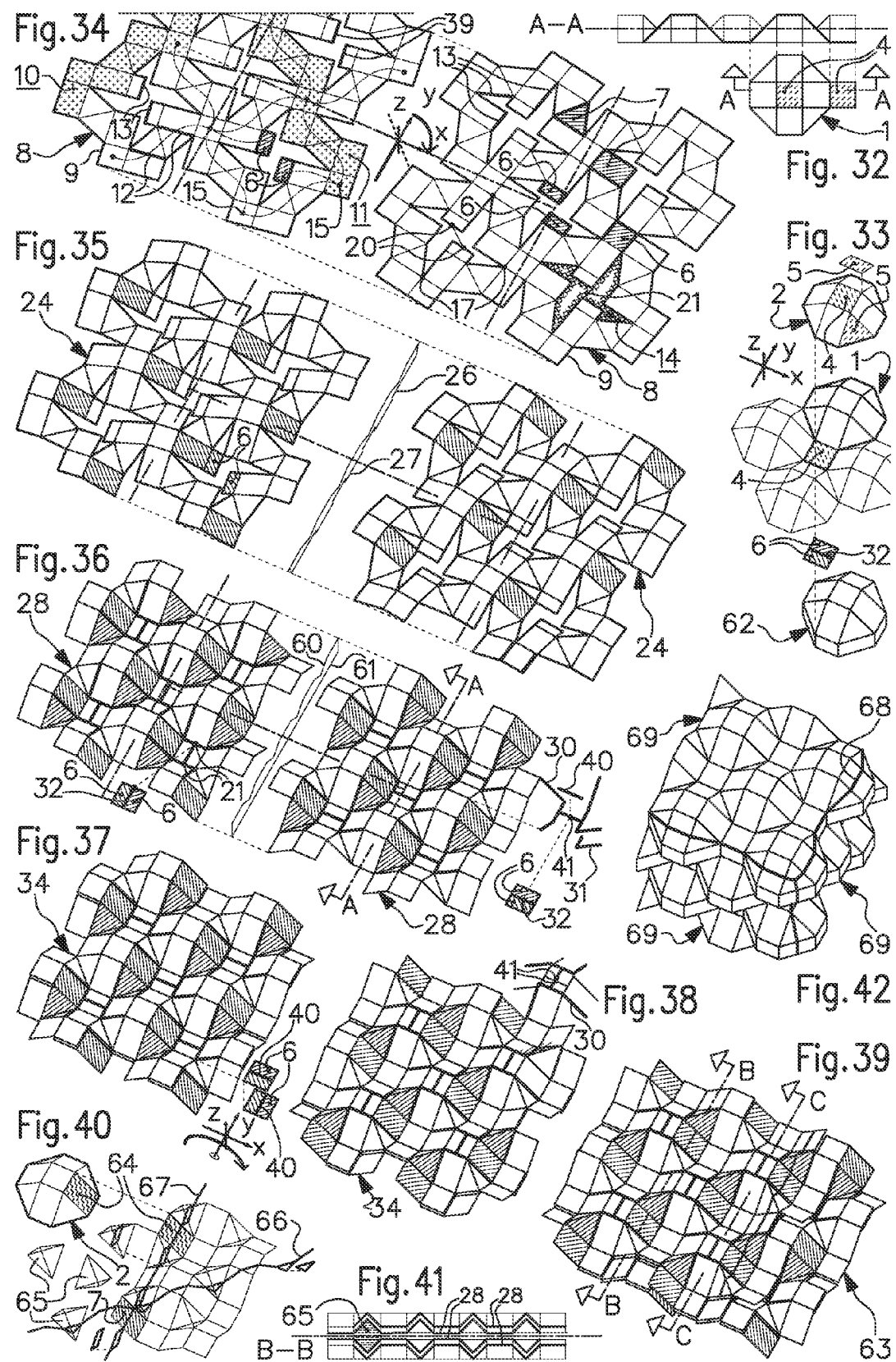

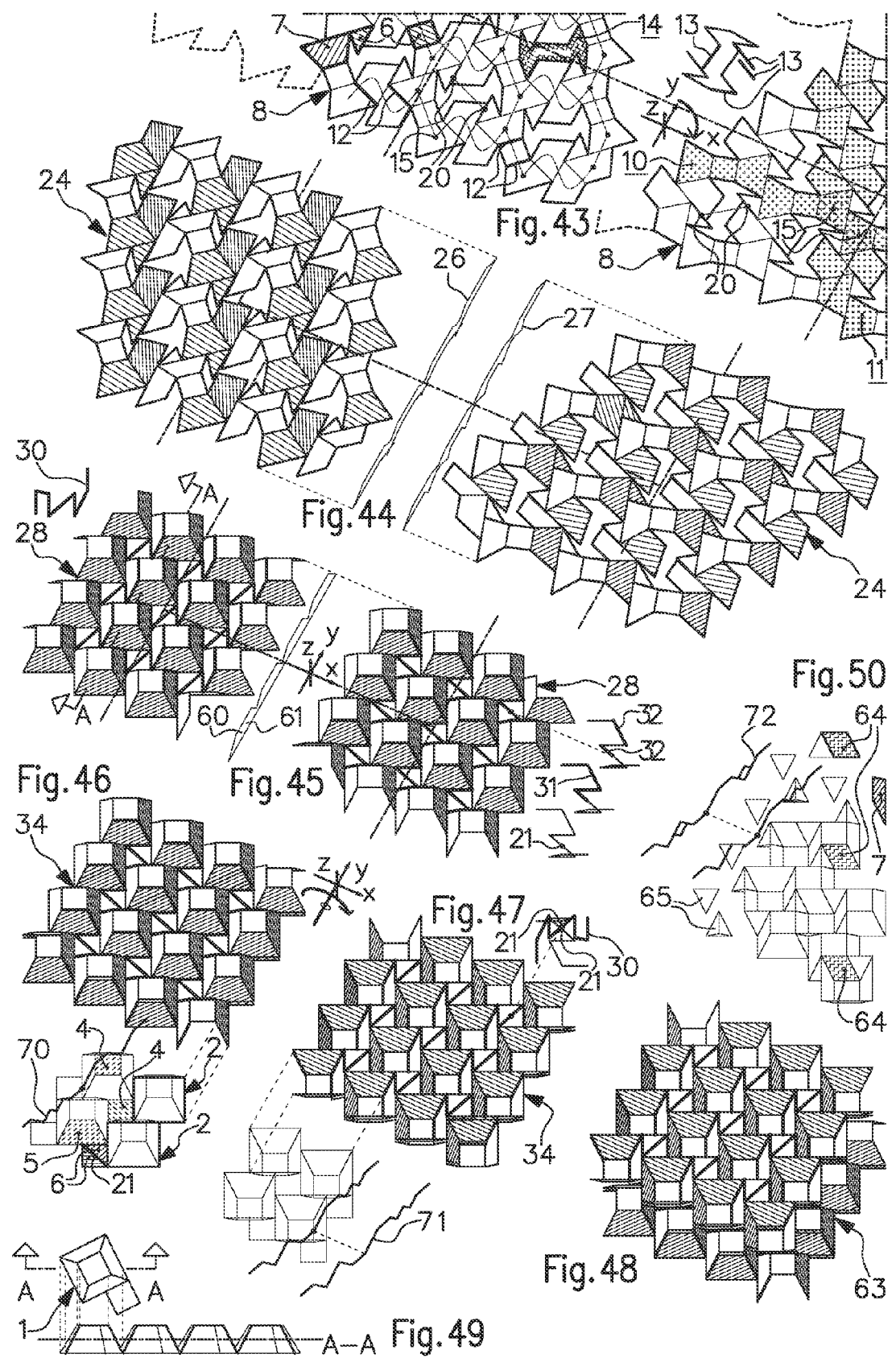

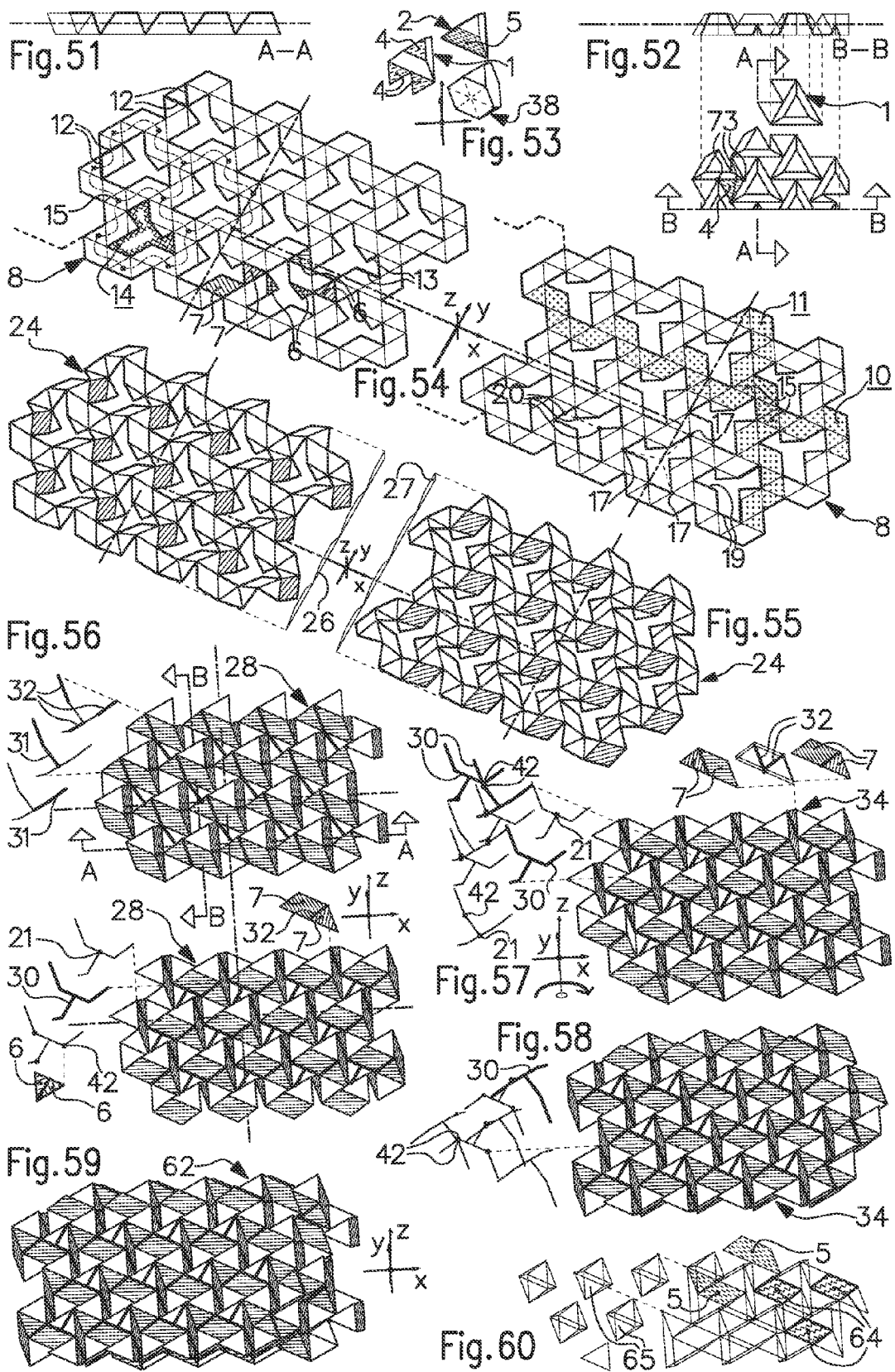

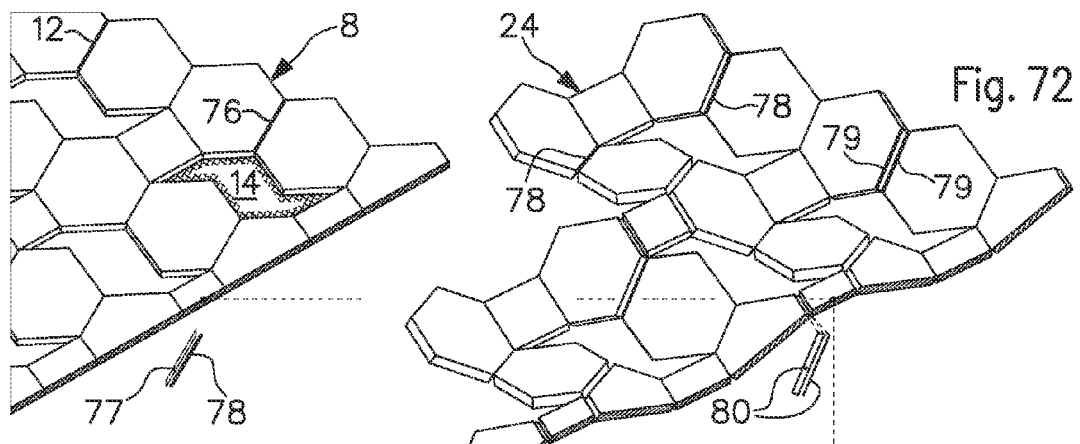
Fig. 71
Fig. 72
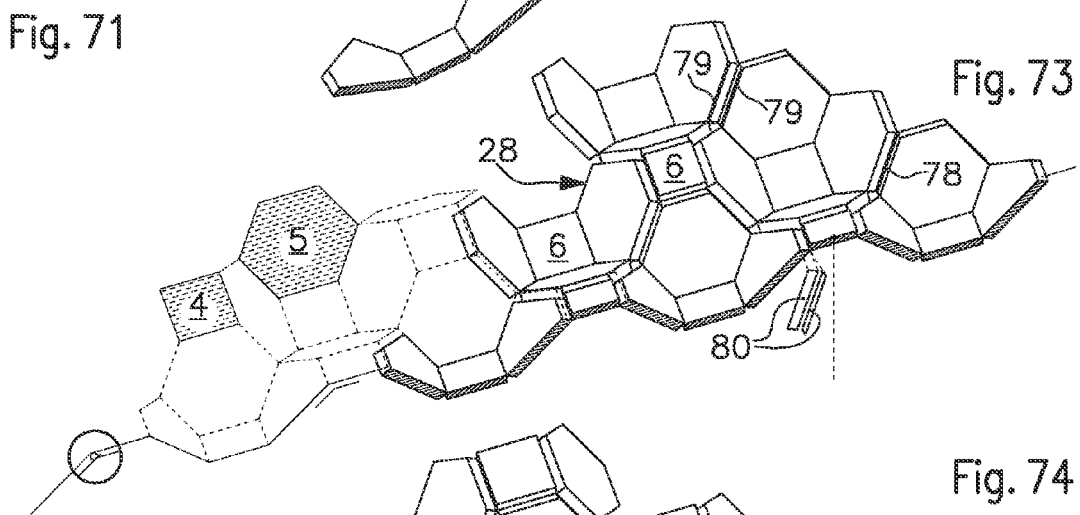
Fig. 73
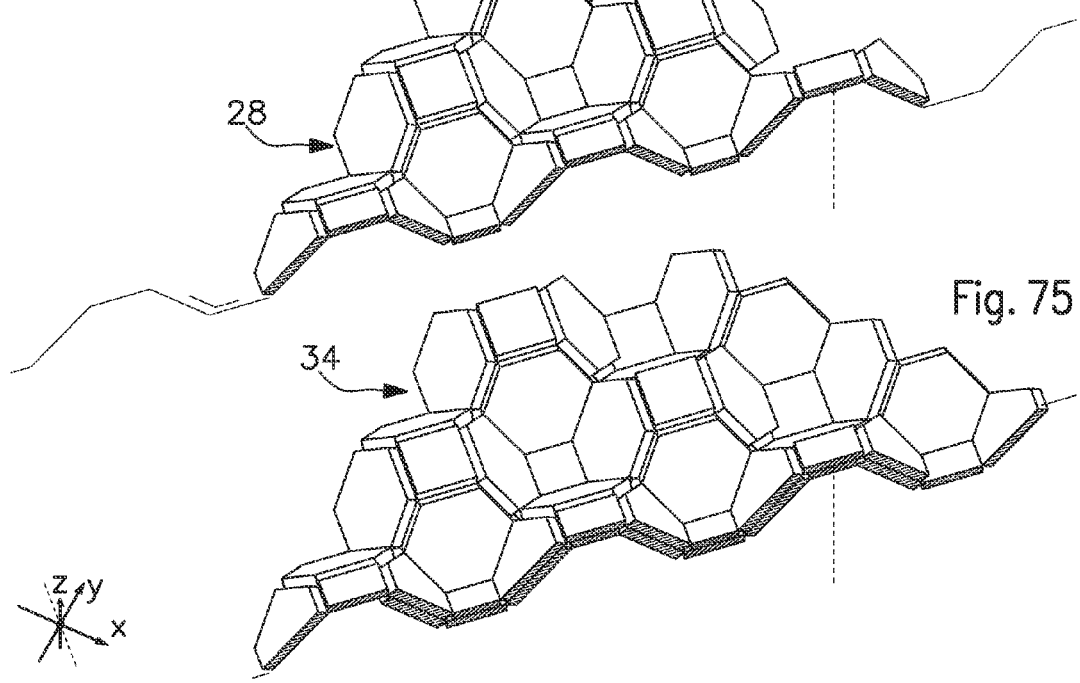
Fig. 74
Fig. 75

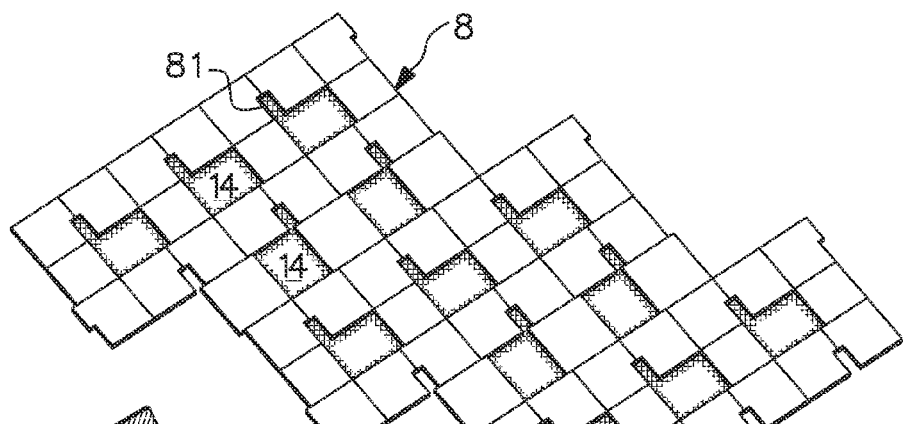
Fig. 76
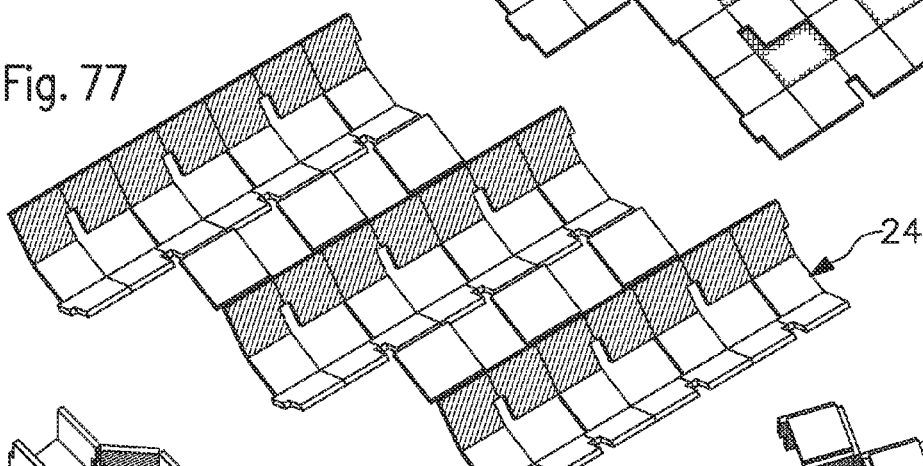
Fig. 77
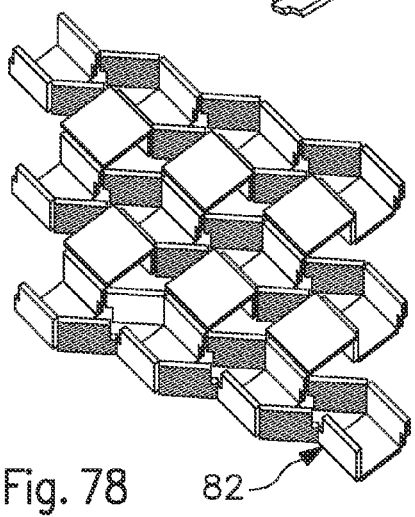
Fig. 78
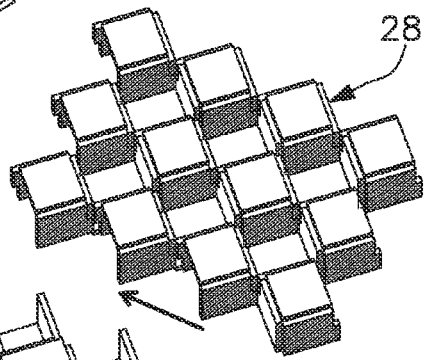
Fig. 80
Fig. 79
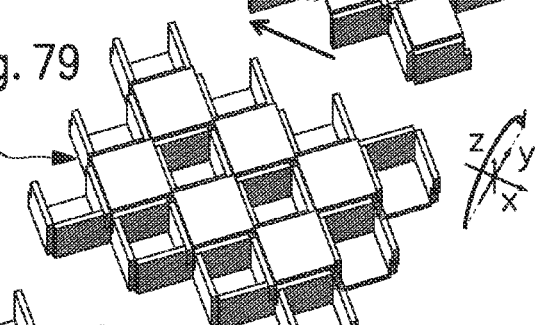
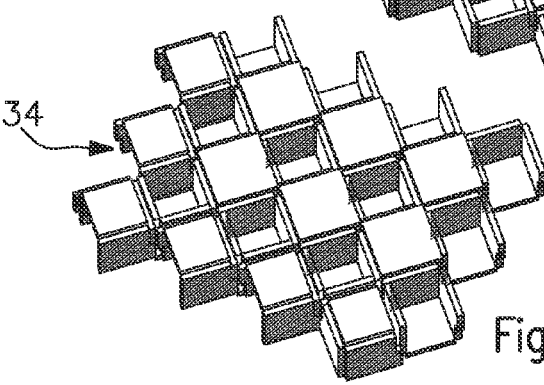
Fig. 81

FOLDED STRUCTURE, INTERCONNECTION OF ELEMENTS, SANDWICH PANEL, AS WELL AS FOLDING PROCESS AND FOLDING TOOL

CROSS REFERENCE TO RELATED APPLICATIONS

Priority is claimed to German Patent Application No. DE 10 2014 011 775.8, filed on Aug. 9, 2014, the entire disclosure of which is hereby incorporated by reference herein.

FIELD

The present invention relates to a spatial structure of at least one planar blank. Such a structure is provided to be applied in very diverse technical fields of lightweight design and lightweight construction in different economic sectors. Besides, this invention relates to the interconnection of the borders of two portions of such a folded structure as elements, moreover to a sandwich panel with this folded structure as a core layer, as well as to a process, and a folding tool for folding a planar blank for such a folded structure.

BACKGROUND

A folded structure is a fabric made substantially by folding regularly at many places simultaneously at least one planar blank of a flat material being available as a thin flexible sheet or, a more rigid panel. This fabric has a periodic pattern of bilaterally arrayed elevations and depressions. This pattern is thereafter called "relief pattern". The originally planar blank is subdivided into a plurality of plane segments, that is, into areal entities being small sections within the initially continuous material.

The folded structure extends within an X-Y-plane, thereafter called "zero plane". Because of its relief it features a height in the Z-direction perpendicular to the zero plane—in a proportion between two times the edge length of a segment and two times the length of the relief pattern's basic unit in X-, or Y-direction.

Miura folded structures according to patent JP 3673519 B2, having a zigzag relief pattern, folded from their planar blank without holes and slits, have the disadvantage to be unfoldable back into the initial planar blank's zero plane. Thus, they can't neither transfer forces by themselves nor keep their shape under load. They are fixed only in conjunction with a plane skin layer. Hereby, they are each only a folding core of a sandwich panel. Besides, this folded structure is subject to geometrically induced constraints in detail at each meeting point of four folds, especially when the flat initial material has a notable thickness. Also oblong areal horizontal chamfers of the folds according to FIG. 2 of Koryo Miura's patent application publication DE 2213472 A, 1972, don't change this principally. This applies as well to somewhat larger areal chamfers of the folds according to FIG. 1 of patent US 2011/0281080 A1 being visible as valleys and ridges whose course is ascending and descending.

Despite of its hinged folds, the folded structure is driven apart again by the restraints in the folds' vertex points. That is why at numerous places each blank needs to be conducted not only to initialize the folding process but also during the folding process. In the case of a compactly outlined blank, this happens by bars at scissor grids. In the case of a continuous fabrication, this happens according to U.S. Pat. No. 6,913,570 B2 by a series of pairs of rolls whose jackets have a different relief or, by an increasing roll width according to U.S. Pat. No. 7,758,487 B2, or as well by an increasing relief depth of the rolls' interlocking surfaces. The intrinsic restraints of the completely folded Miura folded structure can be mitigated if the fold lines are made very deep and large. This again weakens it as a whole.

A lot of glue has to be used to enlarge the junction of such a folded structure to the skin layers. It has to be viscous and it must cling to the neighboring faces after calefaction. (products of the company Foldcore GmbH, Stuttgart, Germany, http://www.foldcore.eu/index.php?option=com_content&view=article&id=70:verbindungstechnik&catid=42:verbindungstechnik&Itemid=70). Besides, without reinforcement by impregnation or coating with resin, the long folds running from top to bottom and being still situated unattached in a supporting core's hollow space, that is, being not tied to the skin layers can deviate easily in parts from the provided fold line and, give way.

Folded structures having the well-known hexagonal honeycomb pattern for a sandwich panel's core layer, nowadays folded from one single flat but holey blank from a roll can be glued together already within themselves at many segments' surfaces indeed in order to be not unfoldable back (Pflug, J., Verpoest, I., Vandepitte, D.: Folded Honeycombs—Fast and continuous production of the core and a reliable core-skin bond, K. U. Leuven). However, when implemented later in a sandwich panel, not all of the segments standing upright in a completed honeycomb layer are bonded on their borders via additional, mostly small segments being glue tabs. Besides there are segments being doubled by being glued together extensively face to face, as well as segments remaining still separate. Hereby, the structure is oriented, that is, it is anisotropic.

The regular three-dimensional structure in patent WO 2009/087304 A1 disclosed as "Structure Tridimensionelle" not being foldable flat even without skin layers and being in some degree directionless constitutes the recent state of the art of a folded structure. It consists of at least two ply sheets each from a folded blank of a plane planar blank material whereby all fold lines are parallel. This folded structure is already based on a perfect dense packing, as a spatial pattern, of tetrahedra being chamfered slightly on two edges and, of slightly truncated pyramids. This geometry is known from plane space frame truss grids, albeit without chamfers.

But here again, both ply sheets substantially meet in detail only edge to face, that is, not face to face. That is why also here a lot of viscous resin is needed to achieve really the merely linear junctions to the segments of another ply sheet. That is why the folded fibrous material such as Aramid paper is rather soaked and coated with resin than only impregnated. Otherwise, the free Loose edges of the sloped small segments could simply buckle and give away. Or alternatively, a very rigid homogeneous planar blank material ought to be applied whose folds being bending-resistant and acting hereby like restrained in a clamp would cause the needed robustness. This could apply only to sheet metal without perforated fold lines. But his in turn would impede folding and, give to it the nature of pressing. Thus, the advantages of folding would be counteracted.

The large, evenly provided holes of the one only holey of both different ply sheets lie close together. Hereby, after cutting them, between these holes, only small links remain for the truncated pyramid tops. Because these links are small segments they can act only as equally small contact-faces for areal gluing.

Two ply sheets being folded according to this patent and glued together sufficiently tight are, as a folded structure, bending-resistant in one direction of the zero plane indeed but can be easily bent elastically In the other one because only the thickness of the blank's material contributes to the bending-resistance. Only by means of a third ply sheet a bending-resistant folded structure is then achieved by a static system with plate action in a small scale. With sufficiently resin glue this folded structure is so robust that it can serve by itself as a supporting structure. Only by this third folded ply sheet, the structure becomes geometrically equivalent in X- and Y-direction—as well as in Z-direction, that is, to the top and to the bottom. Hereby, it becomes equally stiff hereby, that is, as directionless as possible, anisotropic whereby a certain inexactness remains in the detail of the differently high layered horizontal faces. This inexactness has to be mastered while adding plane skin layers with a lot of resin glue or, by the yieldingness of the not yet soaked material.

Hereby, the seeming advantage of folded structures—to manage as a lightweight product with less input of material and energy not only not before usage but also already during its production—cannot be de facto completely exploited. That is why for the same intended use with an equally high technical effort, further on equally robust alternatives are available, These are panels being produced otherwise than by folding. They have to be mentioned because some aspects of their relief patterns are relevant for the examples of folded structures according to this invention.

Alternatives of application to the variant of the "Structure Tridimensionelle" with only two folded ply sheets could be patterned one-ply core layers each being deep-drawn and then welded to plane skin layers of a structured hollow core panel of thermoplastic material. on the one hand a core layer having a relief pattern of alternatingly opposed small waves, or mounts, bilaterally oriented to the top and to the bottom (U.S. Pat. No. 5,400,918); on the other hand a core layer whose frusto-conical bumps are arrayed in the same symmetry of pattern (of the firm Triplex GmbH, Haiterbach, Germany).

Alternatives of application to the variant of the "Structure Tridimensionelle" with one additional ply sheet, that is, with three ply sheets then could be structures of two superimposed ply sheets each having a relief pattern of truncated pyramids. On the one hand, this could be this could be pressing natural fibers in a matrix of resin needing time for drying, as a relief pattern of larger acute quadrilateral pyramids having rounded edges, arrayed without distance (Wonneberger, M.—Invent GmbH—and Leutermann, H.—Pyra Tec GmbH—: "Innovative Wabensysteme für Leichtbauanwendungen", 2005), on the other hand, pressing (sheet metal), injection molding, deep-drawing, (plastics), or laminating (synthetic resin) of weak fibrous materials, as a relief pattern of spaced-apart 3-, 4-, 6-, or 8-sided truncated pyramids (DE 199 44 662 C5: "Räumliche Tragkonstruktion aus flächigen Formbauteilen", 2009, firm Borit, Aachen).

SUMMARY

In an embodiment, the present invention provides a three dimensional folded structure that is folded at regular intervals and cannot be folded flat, for use in lightweight design and lightweight construction. The folded structure substantially extends in two directions including a longitudinal direction and a transverse direction. The folded structure includes a small number of folded ply sheets, each of the ply sheets being folded up in two directions, each of the ply sheets being formed by an originally planar blank of an initially flat material lying in a zero plane and including fold lines and polygonal holes disposed at regular distances. Each of the ply sheets is subdivided into a plurality of segments, each in the form of a polygonal planar entity that is, except at a border of the ply sheet, delimited by a small number of the fold lines and a small number of edge-sections of a respective polygonal hole. The segments are so numerous that no more than two holes border on each segment. The ply sheets, in the planar state, are congruent, except for a specially formed blank border or a possible slight parallel offset of the fold lines and edge-sections to account for material thickness. The plurality of segments are arranged so as to occupy polygons, side by side, along common fold lines and to line up so as form virtual chains, the virtual chains being arranged to form a virtual net in which the polygonal holes are located in virtual meshes of the virtual net so as to be free of polygons. Each ply sheet is folded so as to close each respective polygonal hole into a slit-configuration including at least two slit-chains that meet in at least one key-point and so as to shorten the blank in the longitudinal and transverse directions. The folded ply sheet has, except for the slit-chains, an uninterrupted gapless closed form including a bilaterally relief-shaped surface with a plurality of faceted bumps lined up in several directions of the zero plane. In the folded state, a portion of the plurality of segments are H-segments that are horizontally parallel to the zero plane and a remainder of the plurality of segments are V-segments that are at an angle to the zero plane. One of both relief-shaped surfaces of each ply sheet is defined by an identically shaped virtual system surface of gapless cohering polygons including H-polygons occupied by no more than two gapless neighboring H-segments and V-polygons occupied by no more than two gapless neighboring V-segments. The system surfaces of the At least two of the ply sheets coincide at least partially in a regular arrangement by extensive contact of respective surfaces of the ply sheets, such that the ply sheets are tightly conjoined so as to contact not only entirely over horizontal contact-faces from one H-segment to another H-segment, but also at least partially in obliquely inclined contact-faces from one V-segment to another V-segment so as to provide a gapless folded structure provide by the at least two ply sheets. The at least two ply sheets are conjoined such that each straight slit provided as a section of a slit-chain of one of the ply sheets is bridged over its entire length by at least one segment of the other of the ply sheets.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows the cross section of an already completely folded ply sheet from FIG. 5 and, the top view of a basic unit of its relief pattern;

FIG. 2 shows an oblique view of the two-dimensionally relief-shaped basic unit of FIG. 1;

FIG. 3 shows two planar blanks for the double-ply folded structure of FIG. 6, with holes and fold lines;

FIG. 4 shows the two blanks of FIG. 3 in folding state;

FIG. 5 shows the two blanks of FIG. 4, each completely folded into a ply sheet, with slits;

FIG. 6 shows a double-ply folded structure having a twofold mirror symmetry as well as a twofold rotational one;

FIG. 7 shows the cross section of a multi-ply—here double-ply—folded structure of two voluminously stacked double-ply folded structures each according to FIG. 6.

FIG. 8 shows an angular arrangement of two relief-elements as well as a rhombic dodecahedron as the geometrical basis of its relief pattern;

FIG. 9 shows the cross section of an already completely folded ply sheet from FIG. 13 and, the top view of a basic unit of its relief pattern;

FIG. 10 shows on the middle right side an oblique view of the basic unit of FIG. 9, on the left the two convex polyfaces forming them, as well as on the right a truncated tetrahedron as the geometrical basis for a possible pattern variant;

FIG. 11 shows tow planar blanks for the wave structure from FIG. 14, with holes and fold lines;

FIG. 12 shows the two planar blanks of FIG. 11 in folding state;

FIG. 13 shows the two blanks of FIG. 12, each completely folded into a ply sheet, with slits;

FIG. 14 shows a wave structure having a threefold mirror symmetry as well as a threefold rotational one;

FIG. 15 shows the cross section of an already completely folded ply sheet from FIG. 19 and, the top view of its relief pattern;

FIG. 16 shows below an oblique view of the basic unit of FIG. 15, above it, the two convex polyfaces forming it;

FIG. 17 shows two plane cuts for the wave structure from FIG. 20, with holes ad fold lines;

FIG. 18 shows the two blanks of FIG. 17, in folding state;

FIG. 19 shows the two blanks of FIG. 18, each completely folded into a ply sheet, with slits;

FIG. 20 shows a wave structure having a four-fold mirror symmetry as well as a four-fold rotational one, having numerous segments per area as well as per basic unit of the relief pattern;

FIG. 21 shows a cuboctahedron as the basis for a basic unit, proportioned differently to FIG. 16;

FIG. 22 shows three equal, but differently oriented, relief-elements, two of them angularly interconnected, as well as, a truncated rhombic dodecahedron as the spatial basic unit of their relief pattern;

FIG. 23 shows three relief-elements like in FIG. 22, however larger at each border side by trapezoidal segments for a direct interconnection of the elements.

FIG. 24 shows four equal, but differently oriented, relief-elements, two of them angularly interconnected, as well as, a truncated octahedron as the basic unit of their relief pattern.

FIG. 25 shows an oblique view of the basic unit from FIG. 27, formed from the truncated octahedron of FIG. 24;

FIG. 26 shows section A-A of an already completely folded ply sheet from FIG. 30, having the profile pattern of a cross-sectional cut in FIG. 24, running in Y-direction;

FIG. 27 shows section B-B of the ply sheet from FIG. 30, running in the direction of the X-Y-angle-bisector in FIG. 24 too and, the top view of a basic unit of FIG. 25 for this ply sheet;

FIG. 28 shows two planar blanks for the wave structure from FIG. 31, with holes and fold lines;

FIG. 29 shows the two ply sheets of FIG. 28, in folding state;

FIG. 30 shows the two blanks of FIG. 29, each completely folded into a ply sheet, with slits;

FIG. 31 shows a wave structure having a four-fold mirror symmetry as well as a four-fold rotational one, with few segments per area as well as, per basic unit of the relief pattern;

FIG. 32 shows the cross section of an already completely folded ply sheet from FIG. 36 and, the top view of a basic unit of its relief pattern;

FIG. 33 shows above, a convex polyface and, somewhat below, an oblique view of the basic unit of FIG. 32 at three other polyfaces, as well as, fully below, a convex polyhedron as the spatial basic unit;

FIG. 34 shows two plane ply sheets fort the double-ply folded structure from FIG. 37, with holes and fold lines;

FIG. 35 shows the two ply sheets of FIG. 34, in folding state,

FIG. 36 shows the two blanks of FIG. 35, each completely folded into a ply sheet, with slits;

FIG. 37 shows a double-ply folded structure being not equal on the top and on the bottom, having numerous segments per area and, having a four-fold mirror symmetry as well as a four-fold rotational one;

FIG. 38 shows a double-ply folded structure being structurally identical to that one of FIG. 37, turned upside down;

FIG. 39 shows a four-ply folded structure having been composed of the two double-ply folded structures in FIGS. 37 and 38 as two folding-structure-components, said structure having a four-fold mirror symmetry as well as a four-fold rotational one, having numerous segments per area;

FIG. 40 shows in some parts the imagined wireframe of the edges of the four-ply cell structure of FIG. 39;

FIG. 41 shows section B-B of the four-ply cell structure of FIG. 39;

FIG. 42 three equal, but differently directed, relief-elements, angularly interconnected, geometrically based on FIGS. 32 and 33;

FIG. 43 shows two planar blanks for the double-ply folded structure from FIG. 46, with holes and fold lines;

FIG. 44 shows the two blanks of FIG. 43, in folding state;

FIG. 45 shows the two blanks of FIG. 44, each completely folded into a ply sheet, with slits;

FIG. 46 shows a not bilaterally equal double-ply folded structure having a four-fold rotational symmetry;

FIG. 47 shows a double layer folded structure being mirror-symmetrical to that one in FIG. 46, turned upside down;

FIG. 48 shows a four-ply folded structure having been composed of the two double-layer folded structures in FIGS. 46 and 47 as two folding-structure-components, said structure having a four-fold rotational symmetry;

FIG. 49 shows the cross section of an already completely folded ply sheet of FIG. 45 and, the top view of the basic unit of its relief pattern;

FIG. 50 shows in some parts the imagined wireframe of the edges of the four-ply cell structure of FIG. 48;

FIG. 51 shows the longitudinal section A-A of an already folded ply sheet from FIG. 56, FIG. 52 shows the cross section B-B of the ply sheet from FIG. 56, the top view of a basic unit of its relief pattern and, the top view of this pattern in the part only on the left of the cross-sectional plane B-B of FIG. 56;

FIG. 53 shows, as an oblique view, the basic unit of FIG. 52 as well as, a truncated tetrahedron as a semi-regular polyhedron where this basic unit is derived from;

FIG. 54 shows two planar blanks for the double-ply folded structure from FIG. 57, with holes and fold lines;

FIG. 55 shows the two blanks of FIG. 54, in folding state;

FIG. 56 shows the two blanks of FIG. 55, each completely folded into a ply sheet, with slits;

FIG. 57 shows a not bilaterally equal double-ply folded structure having numerous segments per area and, having a threefold symmetry;

FIG. 58 shows a double-ply folded structure being structurally identical to that one of FIG. 57, in a position rotated 180" in the Y-axis;

FIG. 59 shows a four-ply folded structure having been composed of the two double-layer folded structures in FIGS. 57 and 58 as two folding-structure-components, said structure having a threefold rotational symmetry;

FIG. 60 shows in some parts the imagined wireframe of the edges of the four-fold cell structure of FIG. 59;

FIG. 71 shows the planar blank of FIG. 28 having a hatched material thickness, rendered as a diagonally cut off corner piece;

FIG. 72 shows the blank of FIG. 71, in folding state, analogously to FIG. 29 (left), diagonally cut off;

FIG. 73 shows the blank of FIG. 72 having been folded completely into a ply sheet, analogously to FIG. 30 (left) but without a visible distinction between slits and fold hinges;

FIG. 74 shows the second blank having been completely folded into a ply sheet;

FIG. 75 shows the wave structure having been composed of the two ply sheets of FIGS. 73 and 74;

FIG. 76 shows a planar blank for the completely folded ply sheet from FIG. 79, with holes and fold lines;

FIG. 77 shows the blank of FIG. 76, in a first folding state;

FIG. 78 shows the blank of FIG. 76, in s second folding state;

FIG. 79 shows a completely folded ply sheet having a right-angled cubic geometry.

FIG. 80 shows a ply sheet being structurally identical to that one of FIG. 79, turned upside down;

FIG. 81 shows a bilaterally equal folded structure having been composed of the two folded ply sheets of FIGS. 79 and 80, having a four-fold symmetry and, having only few segments per basic unit which are right-angled by themselves and to each other;

DETAILED DESCRIPTION

Figure 61:
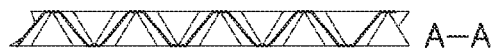
FIG. 61 shows the longitudinal section A-A of an already folded ply sheet from FIG. 67.

In an embodiment, the present invention is based on the problem to fabricate a folded structure being as regular, isotropic, and directionless as possible, not unfoldable, geometrically exact, and being robust as well without causing big expenses of energy and material concerning of its quantity or rigidity, whereby also inexpensive and natural materials can be applied.

In an embodiment, two originally planar blanks are congruent before forming together, touching each other extensively and being rigidly tied, a folded structure having a bilaterally closed, faceted surface, wherein both blanks have a plurality of holes closing themselves to result in slit-configurations at the end of the folding process whereby each blank forms a gapless continuously areal ply sheet having a polygonised relief pattern in a periodically patterned system surface of convex polyfaces.

The polygons of a respective polyface correspond to the segments of a coffer-shaped bump folding out of the zero plane of the initially planar blank to which these segments belong. By reasons of simplicity, a coffer-shaped bump is called "faceted bump". In the completed ply sheet of a folded structure, it is shaped conically in most cases. So, it is shaped as a truncated pyramid. During tightly conjoining the ply sheets, mutually each straight slit of one ply sheet is bridged along its whole length by at least one segment of the other ply sheet. At this, each polygon of the system surface is occupied by maximally two segments whose surfaces are coplanar furthermore.

The advantages attained by the present invention lie especially in the fact that also a thinner, less rigid, or easier recyclable initial material can be applied due to the continuity of the integral surface of both ply sheets' segments tightly conjoined in pairs from contact-face to contact-face, Geometrically exact punching as well as cutting and folding initial materials not going out of square within the plane of its surface, that is, being shear resistant and flat, enables the fabrication also of finely patterned folded structures with a low thickness. Thus, the flat, plane initial material of the blank can be chosen according to the scale conditions and to the loading requirements related to the application. As a panel material, it can be supplied in a thick and stiff quality, as a roll, thin and flexible.

On the one hand,—also without an inner centrical reinforcement by a middle inlay of a more rigid, tough material— simple modest punchable initial materials of cellulose fibers such as cardboard, carton, and paper can be processed, whose material thickness can be still ignored like in the case of thin sheet metal, or, of thin plastic panel material, In doing so, depending on the initial material, the fold lines can be made by imprinting scores, by carving, engraving, milling, perforating or, by dissolving superficially, softening or, founding superficially.

On the other hand, also a thick, rigid, and thus bending-resistant and torsion stiff panel material for larger structures or higher loads can be processed—such as plywood with a centrical inlay of fabric within a flexible matrix wherein the inlay is left as a fold hinge after milling a fold line into the plywood or, not least such as a lightweight panel material, wherein, after cutting along the fold line into the core layer, only one skin layer remains wherein a continuous eccentric fold hinge occurs as a living hinge.

The trapezoidal profile pattern in the cross-section of an invented folded structure resembles that of a usual trapezoidal sheet metal. In longitudinal direction, this causes the static height needed for its bending-resistance. In transverse direction, it causes the shear strength, similarly to the diagonals of a trussed girder. The same applies when both directions are exchanged. Both directions support each other for stiffening. Moreover, the correspondingly larger horizontal polygons being caps of truncated pyramids, coming along with a trapezoidal profile—instead of a V-shaped or a Lambda-shaped profile—act now as larger contact-faces where folded blanks being ply sheets of a folded structure as well as folded structures being component parts of a folded structure or being layers can be joined at numerous places as extensively as possible not only to each other but also to plane skin layers outside.

The large-area contact of two ply sheets within a folded structure—for a conjunction being sufficiently achievable because of being substantially stressed by in-plane shear and thus not being able to tear open because of peel forces, and being only secondarily stressed by out-of-plane shear and bending in detail by a local overlapping of the ply-sheets due to an offset of slits everywhere—enables a broad range of connecting means. At each pair of small segments, the tight junction can have the extents of the whole contact-face; at larger segments, it can also be linear or dot-shaped, the latter only in the case of spot-welding.

The plies can be conjoined in processes without a high imprint pressure because not any geometrically induced restraints hinder an exact folding of the blanks. That is because, due to the holes in the blanks, the constraint points being unavoidable in the case of the meeting of several fold lines within the folded object are avoided principally.

However, the best tight junction is not dot-like or linear but completely areal, that is, everywhere within each contact-face; it is preferably attained simply by gluing but also by dissolving the surface. The simplest is gluing by spraying.

Thus, the applied blank material can be a coherent fiber material comprising sparsely glue. So, the fibers are more than merely the reinforcement or the carrier layer of a hardened matrix solid.

Hereby, resins hitherto being degradable still to a very limited extent can be saved at least in parts in favor of cheap natural degradable fiber material.

Preferably at this, the adhesive and the glue of the cut-out fiber material have both the same substantial base. Before cutting, the blank material should not be pre-impregnated with synthetic resin In order that the cutting waste remaining thereafter can be easily recycled. That is why it should be already itself in-plane shear resistant and stiff enough indeed.

The novel folded structure can be well applied as a layer or spacer between other building elements, e. g. as an air-conducting substructure for rear-ventilated facades, as a mould for installation cavity screed flooring, as a supporting spacing layer for balcony floor paving, Besides, it is suited for sound attenuation when at least one of both surfaces is uncovered, used as a facing or, cladding or, as a standalone element—as a wall of a machine housing, as a traffic noise barrier or a formwork panel for the latter made of concrete, as a visibly coffered acoustical façade, acoustical wall or, acoustical ceiling as well as a paneling of walls and ceilings.

On the one hand, several unconnected portions of a folded structure of all-over extensively conjoined ply sheets, thereafter called "double-ply folded structure", are well stackable for storage or transport in most cases despite their height as a single item, similarly to egg cartons. This applies not only for those having a cubic relief pattern with a U-rectangle instead of a trapezoid in profile. On the other hand however, these items acting as layers causing distance and being voluminous can be opposed exactly to each other, not touching at their sloped segments but only at their horizontal segments; they can be tightly conjoined into arbitrarily thick and thus spatially extending folded structures.

A version of a double-ply folded structure, thereafter called "wave structure", shows a relief pattern being undulated in two or three directions for faceted bumps that are oriented alternatingly to both sides, above and below the zero plane. The fold edges between several segments lying inclined to the zero plane meet at a point within the zero plane, quasi positioned as the midpoint of a polygonised symmetrical saddle surface, whereby these edges are comparatively short and thus little endangered by buckling. Besides, their blanks are a spatial folding mechanism like a Miura folded structure. Hereby, folding is facilitated. However, this applies only if everywhere exists a bed acting as a slide bearing.

When elastically bent out as a whole of the zero plane, a wave structure is applicable also as a folded core for mono-clastically curved sandwich panels.

The advantage of the version being a wave structure lies in the fact that only two folded planar blanks suffice indeed already to fabricate a robust, two-dimensionally isotropic, and bilaterally upside and downside equal folded structure. A third ply sheet is not necessary to attain the intended areal directionless and bilateral equality.

In an embodiment, a wave structure consists of very few and as well simply shaped segments. That is why it is suited very well for application in a small scale with small dimensions, that is, for fine structures with a small depth. But also in a realized version having segments with larger dimensions, portions of a wave structure can be well applied, e.g. as panel-like frameless prefabricated building elements for large-span façade claddings. Here, either the planar blank is already outlined appropriately or, alternatively the needed portion is cut out in accordance with the relief pattern from a wave structure already available as a pre-product in large-area dimensions. With right-angled faceted bumps, also a piece of furniture being a room partition acting as a shelf from both sides is foldable.

In an embodiment, each ply sheet having only unilaterally oriented faceted bumps shaped like truncated pyramids having comparatively long fold lines running completely from the top to the bottom, the faceted bumps of both confronted ply sheets can interlock, and be superimposed and opposed in same time, such that these both ply sheets leave not only, but enclose too, hollow spaces in regular distances always between several sloped segments.

Polyhedral cell-like closed hollow solids are formed from part areas of all these segments. These solids are an integral part of a spatial folded structure being stiff by them. This structure is thereafter called "cell structure". Besides, each fold being part of a ply sheet of a folded structure and running from the top to the bottom gets additional support by a segment lying close to it and sloped to the zero plane or, even in same time, by a fold of the other ply sheet, running along its fold line. Not any slit reaching from the top to the bottom has to be left unbridged.

Cell structures can be applied self-supporting without a substructure because the cells regularly stiffen the folded structure intrinsically. Moreover, the enclosed hollow spaces can be used as resonating bodies if the material has been perforated appropriately; they can be used as luminaries if the material has been perforated appropriately or, is translucent at least in parts.

The integral surface of the sloped and horizontal contact-faces of the segments of both ply sheets, the segments touching each other in pairs for conjunction, is continuous also here like in the case of a double-ply folded structure, as described above, indeed but leaves quasi isles clear at places where the ply sheets don't touch each other.

In an embodiment, only two ply sheets in a cell structure in total suffice to fabricate a folded structure that is comparable by its completely enclosed cells to the "Structure Tridimensionelle" in its version with three ply sheets.

Also at their cut border edges, cell structures are less yielding than wave structures because numerous diagonals are cut there which can cross those of the cut edge of a neighbored folded structure abutting as a building element, instead of failing each other. Because of this, the cut border edges of abutted portions of a folded structure cannot be pressed so easily in each other.

An embodiment combines two two-ply folded structures everywhere conjoined ply sheets on the one hand with the generation of stable cells with voids between two ply sheets on the other hand, to result in a four-ply folded structure.

This causes more robustness and enables in addition a broader range of relief patterns.

In an embodiment, both ply sheets are structurally identical, that is, not mirror-symmetrical to each other.

In another embodiment, the interconnection being easily to perform, stable gapless and hereby inconspicuous, of two relief-elements at the border of two portions each cut out of a wave structure, namely by means of a butt strap being stiffened by a regular folding following the relief pattern in respect of cutting and folding wherein the interconnection is at least as stiff as the wave structure itself.

The interconnection doesn't work only between two relief-elements within one and the same zero plane but just even in two zero planes at a corner, without breaking, or interrupt, the surface's relief pattern at the corner of both elements.

In an embodiment, a folded structure is handled as a folded core layer within a sandwich panel, as a folded core. By a folded structure as a folded core, an improvement, that is, more stiffness and directionless compared to corrugated cardboard is achieved; as well, an alternative of application especially to extruded hollow core panels or, to deep-drawn welded structured hollow core panels, is available.

According to an embodiment, a cell structure as a core layer in a tight junction to two skin layers enables a completely closed-celled sandwich-panel core whereby the sandwich panel gets a degree not only of bending-resistance but also of heat insulation that cannot be attained by wave structures as described above as well as by the known hollow core panels, by structured hollow core panels or by Miura folded core sandwich panels because all these panels have continual hollow spaces pervading the core layer continuously. These hollow spaces are sometimes named inappropriately "cells".

A rather thin folded-core sandwich panel ranging from 2 to 6 mm is suited to be incorporated in products that should light and rigid not only because of material saving but also even because of energy-saving transport, such as torsion-resistant packages, envelopes or transport containments (boxes, cases, receptacles, containers), displays for exhibitions or advertising, for scenery, teaching aids or, toys or gaming devices. Here, the cut border edges must not be too sharp-edged in order that lesions by cutting by exposed edges or by jamming in closing fold slits or blank's holes can be avoided.

Moreover, if it consists of a thin but very rigid material, a thin sandwich panel according to the present invention can be in turn itself the blank material to be folded, in a material-saving way, into an inventive large folded structure having large segments.

When available in various thicknesses, the invented sandwich panel having differently fine relief patterns for the core layers is applicable not only for supporting or self-supporting envelopes, stillages, decks, planes, partitions and revetments within the transport sector generally and in the aerospace branch such as in aircraft construction, but also within the rest of vehicle construction (wagon, locomotion, funicular cabin, truck superstructure, mobile home, caravan, trailer, car, ship, boat. There are further application options within machinery and plant construction (machine casing, maintenance platform, supporting layer for aggregates such as solar collectors, in furniture manufacture, shop fitting, exhibition stand construction (desk and countertop, partition panel, side panel or rear panel, bottom panel, top panel, shelf, door respectively of a rack, cupboard, chest, counter, pedestal, partition object, partition screen, carrier layer for a traffic or direction sign), and generally in building and construction industry (formwork element, hut, cabin, modular unit, temporary building, holt, as well as in interior construction especially as a rostrum, a low stand for spectators, a spandel-braced hollow floor, a stationary or mobile partition wall, a room partition, a WC partition wall, a firmly fixed parapet slab, a leaf or wing or door section.

In shell construction state, then rather of a solid initial material where fold lines are milled in, invented, circa 8 to 25 cm thick folding-core sandwich panels could form whole envelopes supporting themselves, and other horizontal or vertical loads, without a substructure; Or, these panels could form only room boundaries or borderlines such as a slab for: the bottom, a canopy, a roof or balcony, a gangway, a flight or landing of stairs, a parapet and/or suspender beam or plate; and walls.

A corner panel combines the advantages of a sandwich panel with those of a stiff angled interconnection. Not only straight façade corners can be built like this, but also room modules with stiff corners, as well as footbridges as a beam with a U-profile for deck and railings.

In an embodiment, a process facilitates folding a plane cut into a folded closed ply sheet of an invented folded structure against the remained resistance of still somewhat inflexible folds. Here, it is made use of the fact that the ply sheet according to this invention is a folding mechanism, like a Miura folded structure. Unlike this however, it has a polygonally outlined silhouette instead of a continuous one outlined as a straight line on the top and on the bottom. Hereby, the folding process is comparable to extrusion molding through a stencil tool, yet only with little pressure. Thus, folding in several states in sequence can be omitted—excepted a folded structure with a cubic, right-angled geometry.

A folding tool according to an embodiment of the invention as a spatial stencil shaped as a duct to be passed, having a clearance outline changing along the way, conducts the holey planar blank within one step continuously during the folding process and, thus transforms it successively to achieve the right folded shape of a closed relief-patterned ply sheet to be conjoined after that still with at least one other ply sheet.

It already one separate segment has large dimensions, a folded structure according to an embodiment of the invention can also be assembled of single segments being single unit parts indeed, by means of additional articulation pieces or hinges. Thereby, the folded structure is realizable in most different scales, that is, not only with very small segment dimensions in a millimeter range, or middle ones up to around 10 cm, but also with very large segment dimensions in a two-digit centimeter range.

Embodiments of the invention are shown in the drawing figures and described in details thereafter. However before this, some remarks concerning the consistent way of rendering:

A spatial coordinate cross serves as orientation. The zero plane is rendered extending horizontally and described also accordingly. From the origin positively, X is directed to the right side and slightly to the front, Y to the rear and slightly to the right, and, Z perpendicularly upwards. Both surfaces of the sides of the examples of folded structures are positioned above and below along the Z-direction. Objects rendered in an oblique parallel projection are always seen from the upper right side—always from exactly the same direction, except FIGS. 53, 56 to 60, 64 to 69, and FIG. 82.

For a better spatial understanding of the rendered matter, all segments of at least one family of equally oriented segments are hatched with continuous lines. Mostly, these segments are averted from the imagined light coming from the upper left.

Most of the figures ignore the thickness of the blank's material. In oblique views in parallel projection, thick lines serve to recognize the closed slits, actually being inconspicuous at the end of folding, within larger, mostly not hatched areas being recognizable as areal objects merely by outlines and due to lines being hidden by themselves. In unbiased cross-sections being sectional views, thick lines show the section itself.

Each drawing sheet shows one embodiment of a folded structure according to the invention with only one of the possible relief patterns—always including the intermediate steps of their formation. Angles and proportions can vary from pattern to pattern—without changing the topology of the example's relief pattern.

In different examples, also topologically differently shaped objects with the same substantial feature often have the same reference sign.

The word "here" describes thereafter features that apply only for one example. The word "generally" makes return then to a more fundamental matter again applying for several examples and concerning the essence of the invention also beyond one example.

The shown items of embodiments of planar blanks and folded structures span only over few identically repeating basic units of the periodically patterned system surface in order that on one hand a relief pattern is already comprehensible but on the other hand the details are still visible. Because of this, also rather disturbing inserted pairs of parallel break lines illustrating a gap and marking omitted parts of an actually always much larger blank are missing. To save area however some blanks are cut off on one side at a page's border. In the ongoing description they are discussed as if they were whole objects.

By reasons of space, often, in one and the same figure reference signs serving to identify one and the same obviously periodically repeating object in detail, are placed at different items of such an object.

The shortest side line having a true length not shortened by an oblique view, of a polygon or a polygonal segment is uniformly equally long in FIGS. 1 to 55; elsewhere, it is longer because of numerous small polygons.

At first, FIGS. 1 to 31 (4 drawing sheets) deal with a bilaterally equal double-ply folded structure consisting of two everywhere mutually touching ply sheets.

FIGS. 1 to 8 on the first drawing sheet concern such a double-ply folded structure, having a simple relief pattern of twofold mirror symmetry as well as a rotational one, having only few polygons in a relief-pattern's basic unit 1 rendered here in FIG. 1. A relief pattern is generally composed of numerous such basic units having been put two-dimensionally gapless together side by side. Above the basic unit In FIG. 1, a trapezoidal profile pattern in cross section A-A of the left one of both ply sheets from FIG. 5 is shown up.

The basic unit 1 is rendered in FIG. 2 as an oblique view. Such a basic unit is composed at first, like in the next three examples as well, of two somewhat more bold-framed rendered convex polyfaces 2 which are differently oriented. These polyfaces are the system-surface-shaped bumps that fold out from the planar blank and fold up.

These convex polyfaces consist of polygons 3 being in an inclined position to the zero plane and being thereafter called "V-polygons" because of their extents also up and down in Z-direction and, of one polygon 4 being called "H-polygon" because of its orientation in parallel to the zero plane. At horizontal straight borderlines, each H-polygon is adjacent to V-polygons. V-polygons are adjacent also to each other. The upper convex polyface 2 having a bold outline is upwardly directed like a table mountain with a high plateau which can also be considered as a flattened peak, the lower one is directed analogously downwardly like a flat crater. The convex polyface of this example has a shape with only a twofold symmetry in top view. Generally, the V-polygons of a convex polyface are positioned at an angle to the zero plane which can reach the right angle at the extreme.

Two of the smaller, equally shaped V-polygons 3 of the two polyfaces 2 result together in a larger V-polygon 5. The H-polygon is occupied later by at least one horizontally lying segment 6, thereafter called "H-segment". The V-polygon being here, like mostly, larger is occupied later by at least one segment 7, thereafter called "V-segment". The two planar blanks 8, 8 on the left in FIG. 3 are subdivided into such segments 6, 7. 3

By shifting equally oriented V-polygons 3 and by merging them to be additional coplanar polygons 3, the basic unit 1 in FIG. 2 is simplified in comparison to the two convex polyfaces 2 beside it. Imagined being multiplied, it can be recognized in FIG. 5 in the surfaces of the blanks having been completely folded as ply sheets for a folded structure having been folded of the planar blanks in FIG. 3 although the course of the outline 9 of each blank doesn't correspond to the imagined composition of relief-pattern's basic units.

In FIG. 3, the segments 6, 7 each have the shape of a parallelogram. The V-segments 7 have the shape of lozenges here. The two planar blanks 8, 8 for a folded structure are generally congruent concerning the pattern. They can be imagined being superimposed with precisely equally running borderlines. But here, the second blank lies in a position rotated 180° in the Y-axis compared to the first one, that is, downside up. So, here both planar blanks appear now mirror-symmetrically in an imagined top view. But here they are actually mirror-symmetrical to each other, that is, chiral only if the fold lines are prepared unilaterally upside and downside oppositely respectively for a fold appearing from above either as a ridge or as a valley, e. g. by an unilateral stamping, carving or, milling.

Like each blank 8 generally, the two planar blanks each are based on an imagined regular net of chains 10, 11 of adjoining polygons, wherein these chains cross over each other in sets. In its "meshes", this net makes occur geometrically said holes 14 being defined of straight hole-border-edge-sections 13. The net is emphasized by node points 15 each amidst of a polygon 4 occupied by a segment 6, wherein two chains 10, 11 overlay, and, by thin dash-dotted curved lines connecting neighbored nodes. These net lines can be imaged as twines passing through the segments 6, 7 arrayed as chain items, so as to form a mat.

Each H-segment 6 or V-segment 7 occupying a H-polygon 4 or V-polygon 5, excepted the polygons or segments situated on the blank's border, is defined in a straight-line way of fold lines 12 or of hole-border-edge-sections 13. By reasons of clearness in all presented examples, deviating from the composition of whole geometrical basic units, the circumferential outline 9 of the blank has been adapted to the plane pattern of numerous polygons; thus, its jagged course has not been straightened. So it consists of many blank-outline-sections 16. In the presented case, all fold lines 12 between the segments of each of the chains 10, 11, are parallel.

Folding a blank according to this invention can be clarified in comparison to the production of an expanded metal sheet. As a planar blank, a future expanded metal sheet has only slits at first, comparable to narrow joint gaps. During stretching—in only one direction of the zero plane—the blank generates mesh-like holes and also a spatial depth in Z-direction while the blank according to the invention generates spatial depth quasi by compressing and gathering the blank wherein the holes reduce their area to slits. However, there is not a definite subdivision into plane segments on the metal sheet on one side and the invented blank on the other side is not deformed under big pressure.

Geometrically, the hole 14 consists of some wedge-shaped clefts. There are only two clefts here. Generally, each cleft shall contract itself into a slit-chain 31. The two cleft-sides 18 converge at the cleft-end 17 on its peak. Here, these cleft-sides 18 are straight; thus, they consist of only one single straight hole-border-edge-section 13 here. Two cleft-sides form together the cleft-border 19. Their both other ends each form a butt-point 20. By closing the hole, the butt-points 20 shall coincide into one point 21, thereafter called "key point", (Schlusspunkt) in the completely folded ply sheet according to FIG. 5 because there, at this point, the clefts close themselves at the end of the folding process. The two cleft-sides 18 of the cleft-border 19 coincide hereby. In doing so, the gap closes into a slit-chain, thus consisting here of only one single straight line. So, the cleft-sides 18 coincide in one single slit-chain. In FIG. 3, the line connecting the butt-points 20 belonging together is rendered as a thin and extended one.

As can be recognized in FIG. 4, during closing here, each rotation-symmetrical hole diminishing itself doesn't rotate itself while the V-segments rotating themselves are folded each close towards the H-segment so as to form a faceted bump together with this H-segment.

The outline of a hole is twofold mirror-symmetrical indeed, here in the planar blank in FIG. 3. But if the surroundings including the fold lines are included into the considerations, then, the holes are already merely mirror-symmetrical in a flat state however.

In all examples, the periodical pattern of the planar blanks, of the folding objects and, of the completely folded ply sheets are aligned at one side in X-direction. Consequently, one of the directions wherein basic units are added side by side is always the X-direction thereafter. So, oblong blanks can be formed, optionally being developed from a roll, for a continuous fabrication in this direction as a direction for conveying and fabrication. Because of this, on the left, the borderlines of the blanks shown as being compactly proportioned everywhere are indicated each time by dashed lines for an optional extension of the blank.

In some examples, the direction of arraying the basic units of the plane periodical blank-pattern in a direction transverse to the X-direction diverges from the perpendicular Y-direction. Only in these cases of a divergence, the equal points 22 in two relief-pattern*s basic units neighboring in Y-direction are connected by an imagined dashed straight line 23 where the non-parallelism to the Y-axis can be recognized. So, a parallelogram would result as an integral shape if the whole outline 9 of the blank was straightened. In this case, two sides of this parallelogram would have the direction of this dashed line of orientation 22. In contrary to a useful possible straightening of the border in X-direction however, a straightening transversely to it would result often in arbitrary cuts.

The two blanks 8, 9 lying here mirror-symmetrically to each other horizontally in the Y-axis are going to be folded equally into the Z-direction respectively upwards and downwards. Because of this, the two blanks rendered in FIG. 4 each as a folding object 24, 24 in an intermediate state are chiral like in the most examples hereof. But, as can be seen in other examples too, they are not rendered in a directionality to the mirror axis without an additional translation. In an imagined view from the X-direction, the silhouettes 26, 27 projected along parallel projection lines 25 are equal during folding as well as in final state because of chirality. The holes 14 of the increasingly relief-shaped blanks are already somewhat diminished and narrowed in FIG. 4, until then, as can be seen in FIG. 5, merely substantially inconspicuous slit-configurations however rendered highlighted in bold by reasons of clarity remain yet thereof.

In FIG. 5, the two folding objects 24, 24 of FIG. 4 are already folded completely into ply sheets 28, 29 as halves of a future folded structure. The outline 29 of the completed ply sheets follows their subdivision into segments by running to and from. The slit-configurations 30 consist of—here two—slit-chains 31 each consisting of only one straight slit 32. The slit-chains each meet in their—here single—key point 21 at a vertex point of several polygons or segments. Each slit-chain 31 is the rest of a cleft having been surrounded of a cleft border 19. At the beginning, the initial hole has had here the most simple possible shape, that one of a lozenge. In other examples, a slit-chain consists of several straight slits 32 because it is a spatial polygonal chain there. Because here only one single hole-border-section 13 formed a cleft-side 18 there is also only one single straight slit 32 that forms a slit-chain 31.

Each 8 of the two blanks in a flat state differs, as well as the respective temporary folding object 24, from the respective blank as a completely folded ply sheet 28 by the fact that the symmetry of the relief pattern of the completed ply sheet has been broken intentionally by the provided definition of butt joints so as to shape the planar blank geometrically. So, the mirror symmetry of the relief pattern's basic unit is missing in the plane periodical pattern of the blank.

Within the completed double-ply folded structure 34 in FIG. 6, the respectively pairwise superimposed slit-configurations cross over each other at their key points, as it is demonstrated by the three items of such a crossover, shown drawn out on the left. The thickness of an arbitrarily thin blank material was not ignored in rendering the completed double-ply folded structure in so far as the their both ply sheets were spaced apart in Z-direction. This applies also for a cross-section v a double-ply folded structure like in the upper area of FIG. 7.

Section B-B of the double-ply folded structure 34 of FIG. 6, compounded of two ply sheets, can be seen in FIG. 7 above the dash-dotted zero line. As only one of two layers here, this double-ply folded structure can become a part of a multi-layer folded structure. Thus, below this line, an additional folded structure 34 is rendered with dashed lines as an option. This one is structurally identical indeed, but its initial upper side is turned down here. The new centrical zero plane appears here as a mirror axis between the first and the second layer. However, the first and the second layer could have a differing Z-height whereby their blanks would look different.

Beyond that, more than two layers can be voluminously stacked, H-segment to H-segment. But such a multi-layer folded structure must not be confounded with a four-ply cell structure, consisting of two interlocking superimposed double-ply folded structures being folding-structure components.

FIG. 8 finally is based on a variation of the relief pattern of FIGS. 1 and 2, leaving the pattern's topology unchanged. Here, also the V-polygons have the shape of a lozenge. A rhombic dodecahedron 36 as the spatial basic unit of a dense packing of semi-regular convex polyhedra is the base for the relief-shaped surface geometry of the angular arrangement of two relief-elements 35 each consisting of a double-layer folded structure. Thus, all polygons are equal so that the two equally relief-shaped items can join together inconspicuously at a plane butt joint (37) of elements.

The double-ply folded structure disclosed in FIGS. 1 to 8 has already the inventive advantage to be a large-area compound of two ply sheets indeed, it complies with some features of a wave structure. However, because there is only one single direction wherein the evenly arrayed faceted bumps are oriented alternatingly upwards and downward from the zero plane, this folded structure is bending-resistant only within one direction, here in Y-direction, in the case of a curving around the X-axis as a bending deformation. In so far, it can be compared merely with the simple version of said "Structure Tridimensionelle". Within the other direction, here as well as there, only the initial material thickness is at disposal to act. If a better bending-resistance of the folded structure as a whole within at least two directions shall be achieved in addition to a mutual compound of ply sheets according to the invention, then, its relief pattern in top view, or its spatial pattern in different views, must have a three- or four-fold symmetry.

FIGS. 9 to 14 on the next drawing sheet are concerning a version of a folded structure with a topologically different pattern, of less segments per basic unit, with a threefold mirror symmetry as well as a threefold rotational one. The matter is now a wave structure.

FIG. 9 shows that its trapezoidal profile pattern is asymmetrical in cross section A-A of the ply sheet 28 from FIG. 13. The reason is the fact that triangular truncated pyramids as convex polyfaces 2 whereof two, as can be seen in FIG. 10, form again the respective basic unit 1 have principally an asymmetrical cross section running along a ridge-like edge. Only in a section at a right angle to it, a mirror-symmetrical appearance would arise as a result.

In FIG. 10, like already in FIG. 2, two coplanar small V-polygons 3 of the convex polyfaces 2 form a larger V-polygon 5 of the basic unit 1. This time, two trapezoids form a non-unilateral hexagon with two angles being intentionally orthogonal here. It these hexagons were regular, the relief-pattern's basic unit would be a truncated tetrahedron 38 in FIG. 10 n the left, as the spatial basic unit of a dense packing of semi-regular convex polyhedra in order that analogously to FIG. 8 relief-elements as portions of a folded structure could be angularly arranged without gaps—in this case however not at a right angle of their zero planes to each other.

Generally, the polygonal shape of the regularly uniformly equally recurring segments is freely modifiable as long as the symmetry of the relief pattern as a whole, as well as the parallelism of edges or fold lines, is maintained in the planar blank.

Applying the geometry of regular hexagons would have resulted in comparatively steeply sloped V-segments. But here, the faceted bumps of the ply sheets are kept flat not only such that, in the renderings, all segments are visible from the chosen uniform viewing directing but also get, in superimposing the two ply sheets, not actually conspicuous distances between their H-segments to be conjoined—similar to the distances between the flat bottoms of stacked conical cups. These small distances are tolerable in the case of a small initial material thickness. I there is more thickness, the blank has to be modified starting from the underlying plane polygon pattern, as will be demonstrated later in FIGS. 71 and 75.

Because the blanks are generally much more extended in the zero plane than the folded ply sheets, in FIG. 11 and also in other examples, to save space, the right blank 8 is bisected by a dash-dotted line and rendered only half after omitting its right part. Also these both blanks appear mirror-symmetrically like those in FIG. 3 even if they are congruent concerning their contours including the holes.

Consequently, the equally again congruent silhouettes 26, 27 of the two chiral folding objects 24, 24 are fused into one single silhouette in FIG. 12.

The completed wave structure 34 in FIG. 14 is already more directionless than the double-ply folded structure of FIG. 6 of which the shape could have been considered nearly still as a strongly rippled trapezoidal metal sheet. There is now the equal trapezoidal profile pattern in three different directions of cross-sectional planes. Hereby, this wave structure even now appears not only more accurate but also even more directionless than said "Structure Tridimensionelle" in that one variant that needs one additional ply sheet in comparison. Nevertheless, these advantages diminish by said minor symmetry of the trapezoidal profile pattern in cross-section. Compared to the following examples of four-fold symmetry there is an additional disadvantage of this wave structure according to FIG. 14 compared to the two following examples: This is the fact that, despite its relief pattern being already fortunately directionless in relation to a very large portion thereof, it shows two different cross-sections at a right angle to each other. This could be relevant for a portion having been cut thereof orthogonally. But this doesn't matter in the case of portions cut-out to result in a freeformed, a round or, a hexagonal contour.

Like still the two following examples on the next two drawing sheets, this folded structure being a wave structure has faceted bumps however that are oriented alternatingly upwards and downwards not only within one single direction. Here, there are even three directions, more than in the next two examples which have only two.

A disadvantage for producing a planar blank 8 in FIG. 11 of this example for a wave structure and also of other examples for folded structures is the fact that segments cantilever into its holes. These segments, thereafter called Loose segments, are linked like a peninsula at only one side, that is, at one single folding line 12 towards the blank being continuously coherent for the rest doe to its net-like configuration. Normally, there are two fold lines where a segment within a blank is linked in because, as has been said, each segment is a member in a row as a chain of polygons wherein the chains superimpose geometrically each other like in a net. With these Loose segments, the imagined net is fringed intrinsically regularly.

Also the holes 14 of the plane blanks in FIG. 11 have again only a twofold rotational symmetry. But here, they are larger than in the preceded example of double-ply folded structure. Because of the existence of the Loose segments 6 being right-angled triangular here there are now tree instead of two butt-points 20, which later coincide within one key point 21. This happens twice per hole. Each hole has four small clefts here. Twice per hole, two here small cleft-borders 19 adjoin to each other in a butt-point 20. In addition to the clefts, in each hole of a blank of FIG. 11, there is a large gap between the two pairs of clefts. That is why, unlike FIG. 3, additionally two gap-borders 39 are inserted between the cleft-borders 19. On both ends, these gap-borders are linked with a small cleft-border 19 via s butt-point 20.

Thus, the hole border is divided into six border-edge-sections. Four thereof are cleft-borders 19 of which respectively both cleft-sides 18 converge to close the cleft and to coincide hereby within one slit-chain 31. Two of the border-edge-sections are the gap-borders 39. Gap-borders being polygonal chains spread-out lengthwise converge in pairs alongside so as to coincide finally within one slit-chain. The resulting slit-configurations 30 in FIG. 13 consist of—here thus fife then—slit-chains meeting here in two key-points 21. Four slit-chains 31 being small here and each consisting only of one short slit 32 are each the rest of a cleft having been flanked of a cleft-border 19 of two cleft-sides 18. These four slit-chains 31, thereafter called "end-slit-chains" because of their position at the ends of the slit-chains, are attached to a fifth slit-chain 40, thereafter called "mid-slit-chain" because of its position in the middle of the slit-configuration. Here, it is a planar polygonal chain which consists of four straight slits 32 of which the two middle ones are aligned.

The two centrally superimposed slit-configurations 30 of the ply sheets 28, 28 of a completed folded structure 34 in FIG. 14 don't cross over at key-points here but, at the mid-crossing-points 41 being the midpoints of each of the two slit-configurations 30 in the middle of a mid-slit-chain 40.

Within both completed ply sheets 28 of FIG. 13, respectively two small H-segments 6 neighboring along a straight slit 32 and having been initially Loose segments 6 of a planar blank occupy one H-polygon within the folded structure 34 in FIG. 14 By the second ply sheet of FIG. 13, the slit situated between the two initially Loose segments is bridged by segments 6 having the same shape in respect to each other and to the first ply sheet and being positioned above the two segments and having been Loose segments as well, So, the completed folded structure occupies here a triangular polygon with an object of four segments which is similar to the four parts of a closed folding box, just simply triangular.

The one slit 32 between these Loose segments crosses over the respective other slit 32. Superimposed with a certain offset along one direction within the zero plane, two slit-configurations 30 that don't cross-over each other at their mid-crossing-points 41 cross over mutually at points 42 somewhere respectively in such a straight horizontal slit 32 of a mid-slit-chain 40. Such a point out of the middle of one slit-configuration is called thereafter "side-crossing-point".

In the case of a threefold wave structure and, of a later described cell structure as well, two H-segments are unavoidable presumably as Loose segments per hole of each blank. Loose segments are not a part of said folding mechanism; so, they complicate folding. Equally by that reason, no segments being Loose by having been cut-off arbitrarily are provided on the border of blanks in order that the border of blanks follows the imagined net of dash-dotted line lying all-over between two node points 15. Because of this however, and also to avoid any border-irritations of the geometrical pattern, the blank's outline 9 protrudes and recesses periodically more distinctly in its course. Hereby wider, only one-ply zones are formed on the border in the completed folded structure, which must be cut off finally to simplify the damage-free transport.

As will be demonstrated later, Loose segments as V-segments can be avoided by integrating respectively that polygon, of a segment, that usually has to be planned to be occupied with Loose segments, by a meander-loop as a detour in a dash-dotted line between two node points 15 of the net so as to avoid branches.

To limit complexity in folding and conjoining, generally no more than two neighboring segments of a ply sheet occupy together entirely one polygon of its system surface, regardless whether V-segment or H-polygon, regardless as well whether Loose or integrated in a chain of polygons. Three or more segments per polygon would cause the blank to be unnecessarily compartmentalized and besides possibly fragile.

FIGS. 15 to 22 show a wave structure that, due to its four-fold mirror-symmetry as well as rotational symmetry, doesn't have Loose segments However, their basic unit 1 in FIG. 15 has comparatively many polygons. Thus, this wave structure is finely patterned. The convex polyfaces 2, 2 in FIG. 16 each have eight polygons 3 of two different formats here. The convex polyface is here a quadratic four-sided antiprism whose top is smaller as the missing bottom. Because of this, two plane blanks 8, 8 consist in FIG. 17 of V-segments 7 having not only the shape of a parallelogram as a larger V-polygon 5 of two flat isoceles triangles 3 but also that one of an acute-angled isoceles triangle 3 as a V-polygon of another format within the geometrical basic unit.

Although the blank is rather compartmentalized, it is not filigree or fragile yet. Its holes 14 are comparatively small; the distances between them are comparatively large.

The outlines of these holes are four-fold both: rotation-symmetrical and mirror-symmetrical. But when the surrounding area of the hole is taken into consideration, they are left only rotation-symmetrical. In folding state according to FIG. 18, even this symmetry is reduced to a merely twofold one. But the star-like shaped hole 14 of the plane blank is shown divided in FIG. 17 clearly into four equally large gaps having gap-sides 18 each of only one hole-border-edge-section 13 and having four gap-ends 17 as peaks of the rays. Here there are now four butt-points 20 of the planar blank, each positioned between two gap-borders 19, that coincide within the completed ply sheet in FIG. 19 within a key-point 21 being the midpoint of a slit-configuration 30.

Like already in FIG. 6, also within the completed folded structure 34 in FIG. 20, the key-points 21 of both ply sheets are positioned again respectively in the middle of slit-configurations 30 and again directly one above the other, as shown drawn out on the right beside the completed folded structure in FIG. 20.

Also this wave structure can be altered so that two portions thereof can abut as relief-elements orthogonally at an angle without any gap. For this purpose however, the geometrically underlying convex polyfaces would have to be modified such that they would become the upper or lower half of a rhombicuboctahedron 43 in FIG. 21 as a spatial basic unit for this modified wave structure. Besides, in the geometry of the blank, the thickness of the initial material should be taken into consideration already because the lozenge-shaped obliquely positioned polygons would change into quadrates standing upright upon a vertex.

In four-foldness, the presented examples of this invention show generally the optimum of directionlessness for relief-elements having a rectangular format. The H-polygons have maximally four sides. Hexagonal H-polygons don't occur in the drawings, even not within a folded structure for non-orthogonal building elements. An equally conceivable inventive wave structure of hexagons as H-segments, this structure having quadrates and hexagons as V-segments, would have necessarily additional H-polygons. Hereby, and also because of the size of the V-polygons, the wave structure would have a very large wave length relative to the amplitude, or height, whereby it would be more flexible than one having a short wave length. Besides, the holes of the blank would be so much large that the blanks would become too filigree and would bring along too much waste. More than six vertices are simply just impossible because so numerous straight slits would occur within a completely folded ply sheet that not all of them within the one ply sheet of a folded structure could been bridged by the other ply sheet, this a least not in full length of a polygon's side, Because of that, each H-segment 6 and each V-segment 7 of a planar blank 8 of a wave-structure is not more than twice bordered of a straight hole-border-edge-section 13.

FIGS. 22 to 27 on the next drawing sheet show the geometrical preconditions, as well as the possible applications, of another, equally four-fold symmetrical wave structure. Its formation will be shown then on another sheet in FIGS. 28 to 31. Because this structure has notably favorably few polygons, it will be treated more extensively.

Also in FIGS. 22, 23, and 24, the polygons 4, 5 of the relief patterns can be considered as a part of a regular dense packing of semi-regular convex polyhedra. In FIG. 22, the spatial basic unit is, in addition to a cube, a truncated rhombidodecahedron 44, which can be seen for clarification on the left beside not yet truncated. It is the base for the periodically patterned system surface of the surface-relief of the two elements 46 touching each other in FIG. 22 at an angle without any gap in an element-butt-joint 45. The elements are shown without material thickness. A third such one can be added to these elements equally without any gap. Unlike the element-butt-joint 37 in FIG. 8, the element-butt-joint 45 between respectively two elements 46 runs periodically no longer as a spatial polygonal chain but as a plane one. Therefore, the segments 7 each occupying a large polygon 5 are halved on the border of the elements into small segments 47 indeed, which occupy coplanar small polygons 3, here trapezoids, and which belong to distinct periodically patterned system surfaces having different zero planes. But at these small segments, the neighboring relief-elements can be, piece by piece, taken together and, side by side interconnected, by individual additional butt-straps 48 having the format of the large polygons 5 of a unhalved segment 7 whereas the element-butt-joint is bridged locally. However, these isolated short butt-straps 48 don't perform a really continuous linear interconnection of the building elements.

The cut sequence of lines 49 shown skewed in an oblique view in the rear, or above, in FIG. 22 has a regular trapezoidal profile pattern.

In FIG. 23, the wave structure according to the areal basic unit 1 of the relief pattern of FIG. 22 is cut off, not following up and down the polyhedra of the dense packing, but straight at each side-border 50 of a relief-element, within the respective zero plane. So, the elements 51 resulting here can be interconnected easily and directly, that is, without butt-straps, at the closely mutually fitting trapezoidal segments 52 being remains of segments 7 halved during cutting out. But also this interconnection is not linearly continuous.

In FIG. 24, the borders of each relief-element to be interconnected are rotated 45° in relation to the relief pattern of FIGS. 22 and 23, within the Z-axis perpendicular to the respective zero plane. This results in a linearly continuous and yet easily feasible interconnection between the relief-elements. But this implies that the proportions within the relief pattern are altered because otherwise there wouldn't be coplanar polygons on the angle. Hence, one has to proceed from another convex basic polyhedron.

Here, the basic polygon is a truncated octahedron 53 derived as a semi-regular convex polyhedron of an octahedron shown on the left thereof as a regular polyhedron. Together with a cube, the truncated octahedron forms the spatial basic unit of a dense spatial packing whose surface can look like a arrangement of three relief-elements at an angle with different zero planes, the arrangement in FIG. 24 imagined being completely assembled without gaps. Now, the hexagonal V-polygon 5 is no longer a truncated rhombus here, but a regular hexagon.

At an element-butt-joint 54 being a planar polygonal chain, two interconnected relief-elements 55 abut again like in FIG. 22 edge-to-edge and without any gap. Due to the altered proportions, the surfaces of the segments 56, here five-sided, remained on the border of each neighboring element 55 are coplanar in pairs also here. Because segments having pairwise coplanar surfaces form an uninterrupted closed row in the case of this relation of orientation of the pattern and the border, two not yet interconnected elements 55, a horizontal one above and a vertical one on the left, can be interconnected side by side via a folded butt-strap 57. Here within the interconnection, folding causes a statical height and thereby an efficient bending stiffness. Before folding, the butt-strap has the shape of a chain 11 consisting continuously of hexagonal polygons 5, The chain 11 relates to both planar blanks 8, 8 in FIG. 28 for the wave structure from which the two elements 55 are cut out from. The fourth relief-element 55 in the front in FIG. 24 has the same vertical zero plane as the still unconnected one on the left behind. Also these two ones can be interconnected bending-rigidly via a butt-strap 57 being structurally identical to the butt-strap shown above on the left FIG. 25 shows how quadratic or equilaterally hexagonal polygons of a truncated octahedron and of a small cube form the areal basic unit 1 of the relief pattern of the two ply sheets 28, 28 in FIG. 30.

This basic unit 1 is shown as a top view in FIG. 26. Correspondingly below, cross section A-A of a ply sheet in FIG. 30 on the next drawing sheet is on view. The cross-sectional cut 58 of this ply sheet is on view also in FIG. 24 on the right even if it is skewed because of its orientation in parallel to the cross-sectional plane; it is on view besides only partially as a cross section of the surface of the upper relief-element 55.

Equally shown in FIG. 24 is the cross-sectional cut 59 of section B-B in FIG. 27, running at an angle of 45° to cross-section A-A. Here appears again the characteristic trapezoidal profile pattern, but now somewhat more distinct than the profile 49 shown in FIG. 22, because the V-polygons are somewhat steeper, that is, more distinctly angled to the zero plane now.

As shown, the interconnection of three relief-elements along the element-butt-joints happens here without any divergence from the relief pattern. Thus, interconnecting indirectly abutting segments having coplanar surfaces by means of butt-straps having a shape provided according to these segments is possible easily and inconspicuously. Besides, the zigzag profile of the butt-strap causes bending-resistance of the butt-strap and of the interconnection as well. The interconnection attains anyway the stiffness within the rest of the element, Even more bending-resistant than the interconnection of two elements within the same zero plane is here the right-angled interconnection of elements at an angle because in this case the lined up, faceted bumps of neighboring elements as polyfaces together in pairs have the shape of an enclosing convex polyface that approaches to a completely closed convex polyhedron.

Subsequently, interconnected relief-elements can be bound up tightly to skin-layers. So, they can be planked afterwards, e.g. as a wall, like the continuous framework of a drywall. In FIG. 24 below, two of such skin layers are visible as large triangular faces on two relief-elements 55 at an angle within vertical directionalities. At that, the relief elements have to be imagined being later interconnected as an elemented sandwich-panel-core-layer. So, the stiffness of the angle as a stiff fold can be exploited like in an unidirectional folded-plate structure consisting of rigidly interconnected slabs instead of articulately interconnected plates. In this manner, rigid spatial corner panels are prefabricated of portions of a wave structure.

As has been in view by comparing FIG. 22 and FIG. 24, there are different options to define, rotated around the respective Z-axis, the directions of the borders of a relief-element being cut out as a lying portion of a folded structure and, the directions of the infinite relief pattern to each other, The shape of the blank changes accordingly. One criterion for selecting the appropriate direction is a preferably low quantity of cutting waste by avoiding a too little compact and too much stretched shape of the straightened entire outline 9 of the plane blank because it deviates from a rectangle as an acute parallelogram The plane periodical pattern of both blanks 8, 8 in FIG. 28 is directed in relation to its outline such that relief-elements like in FIG. 24 with merely little cutting waste can be cut out from the completed folded structure in FIG. 31. The serrated outline 9 of both planar blanks being visible only half in FIG. 28, has each a rotation-symmetrical shape like in FIG. 17. In FIG. 28 however, both blanks are positioned not mirror-symmetrical to each other like those of the preceded examples where the respective X-axis as symmetry-axis is rendered in bold and elongated. Instead of this, both blanks are not only congruent in FIG. 28, but lie also on the same side as lower side. Their difference consists merely in the rotation in the Z-axis, emphasized by a spin arrow in the added coordinate-system. That is why they become, via the intermediate state as structurally identical, not chiral folding objects 24, 24 in FIG. 29, structurally identical ply sheets 28, 28 in FIG. 31 of a completed folded structure 34 in FIG. 31.

The left one of both folding objects in FIG. 29 is diagonally traversed by a finely drawn, edgy undulated polygonal chain. This polygonal chain shows the course of the cut 59 of section B-B of FIG. 27 for the surface of the horizontal element in FIG. 24 and for the completely folded ply sheet in FIG. 30 on the left. This polygonal chain is still comparatively flat in FIG. 29; thus it shows not yet the needed static height as does the trapezoidal profile pattern being efficient then, after a tight conjunction of both ply sheets.

Within the completed folded structure in FIG. 31, as a wave structure, exactly along each folding line 12 of one ply sheet, exactly one straight slit 32 of the other ply sheet is bridged by two segments being linked along this fold line. That is to say that not any fold line remains where a bridgeover doesn't exist. Two bridgeovers of respectively one slit 32 are shown drawn out on the right in FIG. 31: at the far right, one bridging, by a V-segment 7 and a H-segment 6 cohering with it; on the left beside, another one, by two V-segments 7, 7 cohering on a fold being visible as a ridge.

In FIG. 31 on the left, the bridgeover of slits of the lower ply sheet was demonstrated. Of course, also slits being located within the upper ply sheet are bridged over by the lower layer even if purely from a linguistic point of view one should talk of "tunneling under". But this is irrelevant because above and below are exchangeable.

Within each of both ply sheets 28, 28, four segments 7 meet at in a vertex-point 33. In the same way as the slit-chains 31 of two slit-configurations 30 cooincide at key-points 21 located pairwise one upon the other on vertex-points 33, also four folds having fold lines 12 and running everywhere along the slit-chains where respectively a slit is bridged meet here. As can be seen in FIG. 31 at the far right, the four fold lines 12 are here oriented similarly to the arms of a carbon atom within a diamond crystal grid. Apropos, there is right exactly such an orientation of lines to each other at a tetrahedron-angle within the relief-pattern variant according to FIGS. 22 and 23.

In FIG. 30, like already in FIG. 5 and FIG. 19, each slit-configuration 30 of one ply has only one single key-point 21 in its middle, as a point where it crosses over the slit-configuration 30 of the other ply sheet at the key-point 21 of that latter slit-configuration. The same applies vice-versa. Here it doesn't matter again, which ply sheet is located above or below. That "over" as a suffix of "crossing" emphasizes only that slits of distinct ply sheets even having a small initial material thickness only touch each other, one upon the other, instead of intersecting at the same height, like bars don't intersect in a flat grid.

Within the shown wave structures of quadrates and hexagons as well as in the wave structure of lozenges and others in FIG. 20, the key points 21 are located in the zero plane, that is, in the middle of the relief-pattern's depth. That is why the wave-structure's four fold edges meeting quasi halfway up are merely short. In this example, FIG. 31, they are the shortest ones because the side line of a hexagon is shorter than that one of a lozenge in the preceded one. Thus, the four folds there, under compressive load by bending shear within a sandwich panel, can hardly buckle out of its straight polygon edge aberrantly and yieldingly. This ensures the necessary bending-resistance of the sandwich panel having a wave structure as a core layer.

In X-direction or Y-direction, the folded structure 34 in FIG. 31 has already per se a certain bending-resistance without skin layers because it resists bending even so by its half height.

Unfortunately, in each of both directions of the angle bisector between the X axis and the Y-axis again only the pure material thickness is available for bending resistance. In this case, a faintly rigid initial material bents within each V-segment along the horizontal connecting line within the zero plane between two meeting points 33 of folds. This line can be changed also into a fold line so as to avoid a prestress within an elastically bent wave structure as a core layer for a monoclastically curved sandwich panel. Then, the folded structure is no longer bending-resistant, it is even rollable.

Generally, a rigid folded structure can be more bending-resistant than that one in FIG. 31 only if it encloses cell-like voids. One possibility to attain this is: conjoining simply additively a ply sheet as a voluminous layer conventionally with another ply sheet tightly at H-segments as contact-faces, as has been happened in FIG. 7. However, even more efficient than this, even if more elaborate, is: conjoining two double-ply folded structures interlocking then as components into a four-ply cell structure, demonstrated in FIGS. 32 to 60 by three examples. In doing this, the two complete folded structures 34, 34 as folding-structure components are conjoined each not only everywhere from H-segment 6 to H-segment 6 but also at many other places from V-segment 7 to V-segment 7. The results 63 of the three examples are shown respectively in FIGS. 39, 48, and 59.

However, before special features can be discussed by an example of a four-ply cell structure, starting again with a relief-pattern's basic unit 1 in FIG. 32 based on a special convex polyhedron 62 in FIG. 33, generally applying facts have to be explained at first.

The difference between the junction of the two inner ply sheets of a four-ply cell structure 63 to the junction of two ply sheets of a double-ply folded structure, which occurs also—namely twice—within a four-ply cell structure, lays in the fact that not all of the V-segments are used as contact-faces in conjoining the two-dimensionally extending components being here now two double-ply folded structures instead of two single ply sheets. So, either not all V-segments of a ply sheet of one folding-structure component each meet a V-segment of a ply sheet of the other folding-structure component at their mutually facing entire segment surfaces as contact-faces 64, as it applies for FIG. 40; or, respectively two V-segments designated for conjoining touch mutually each only with a portion area of their facing surfaces as contact-faces 64, as it applies for FIGS. 50 and 60.

Each of both folding-structure components 34, 34, shown in FIGS. 34 and 38 as halves of the four-ply folded structure 63 in FIG. 39, is already an individual folded structure, which, as a single one, could serve as a sandwich-panel-core-layer in special cases or alternatively, generally as a spacer. In contrast to the preceded exemplary versions of a wave structure however, the two sides, the top and the bottom, of a separate folding-structure component have no longer the same appearance; instead, they have a different one because the faceted bumps are no longer oriented alternatingly upwards and downwards but only uniformly into one direction, here at first upwards. However, the separate folding-structure component alone is less bending-resistant than a wave structure because there aren't here faceted bumps merging into each other and because there isn't the continuous rigid coherence at the folding-structure's half height or, half thickness.

Additionally to the H-polygon 4 and to the V-polygons 5 of each convex polyface 2, all three relief-patterns each differing at both sides have other H-polygons 4, according to the basic unit 1 in FIG. 32, that are located outside a convex polyface 2 and that are called "Additional H-polygons" thereafter. An Additional H-polygon is enclosed by convex polyfaces of the relief pattern. Accordingly, two maximally here reasonable H-segments of a basin, occupying this polygon, are enclosed here by table-mountain-shaped faceted bumps of one ply sheet 28. The plane ply sheets in FIG. 34 show these—here orthogonal—smaller H-segments 6 as Loose segments that protrude into a hole 14.

If one imagines—for better comprehending the inevitability of Loose H-segments in the case of a blank 8 for a ply sheet 28 in FIG. 36 that is differently relief-shaped on both sides—that a folded structure with its relief pattern were made otherwise than by folding, that is, it were a ply sheet without slits and fold lines and, one would cut it up so as to change it into a flat object having holes, to press it flat, than, the respective H-segments would have to be cut into halves that are exactly such Loose segments so that a hole, which is at least still twofold rotational-symmetric, can develop.

To avoid Loose V-segments one can find for the third one of the thereafter shown relief patterns not being equal on both sides an arrangement of areal entities within a plane blank where meandering detours within the net lines has the effect that each V-segment that occupies only a part of respectively a V-polygon is integrated into a chain instead of hanging loose on it.

In contrast to the known relief-shaped ply sheets for a spatial structure, which are actually otherwise fabricated than by folding but, nearly edgy faceted, the convex polyfaces, and the faceted bumps occupying them, abut in parts also directly to each other at their borders. Hereby the basins are clearly separated from each other. To fold an elsewhere usual relief having a basin extending as a continuous area between uniformly oriented pyramidal or conical faceted bumps, which are spaced apart because of being rounded off, a multiple of H-segments would have to be put together. In this case, because of so much protruding parts within one and the same plane parallel to the zero plane, there would be collision problems during the folding process. These problems could be avoided by dodging border-edge-sections deviating from a straight line e.g. as a zigzag shape or, by intentionally additionally folding apart in an only temporally useful way colliding small portions of segments along folds being necessary additionally hereby. However, the planar blank would be too much membered. by all this.

To avoid equally a filigree segmentation of the blank, only examples with an at least threefold symmetry are shown, because a four-ply cell structure having only a twofold symmetry would imply equally continuous, even if only oblong, plane surface areas that would have to be subdivided into numerous segments.

The relief of a folded structure according to the present invention can have smaller, more acute dihedral angles along the fold lines between the faceted bumps and, have hereby sharper ridges and valleys than otherwise fabricated folded structures having a rounded-off relief shape. Structures according to this invention are effective still with an acute dihedral angle of only 60" while the otherwise fabricated ones reach the minimum for all folds with an obtuse dihedral angle of ca. 120.

So, the other production method causes not only more distinctly profiled relief patterns but also topologically differing ones.

In the case of a blank of a folding-structure component of a cell structure 63, having a relief pattern according to one of FIG. 32, 49 or, 52, the folding-mechanism property of the blank in a folding state doesn't suffice principally, even upon a firm ground, to achieve everywhere that each faceted bump folds out of the zero plane in a definitely predictable way either upwards or downwards. That's because the continuity of respectively two segments, belonging to oppositely oriented faceted bumps and having been imaginarily replaced by a double-sized plane segment, is missing. Due to this continuity, the cassettes cohere rigidly as a whole so as to lever, and to fold, each other into the Z-direction.

Because several faceted bumps of the two folding-structure components of a four-ply cell structure 63 together enclose small closed voids between them, such as in the wireframe in FIG. 40, of which the enclosure forms a robust configuration as a cell 65 having a convex polyhedron's shape, there as a tetrahedron, such a folded structure is also already bending-resistant without plane, not relief-shaped skin-layers for sandwich panels. The regularly arranged rigid cells prevent the folded zones located between them fixedly in full Z-height and consisting of arrayed segments, these zones not having any void between their four ply sheets, not only from folding flat but also, from yielding to bending or, from twisting the folded structure as a whole.

FIGS. 32 to 42, already mentioned in parts, show on one sheet the formation of a four-ply cell structure having comparatively numerous polygons per basic unit of the system-surface's periodical pattern. According to FIG. 32, this basic unit 1 has comparatively numerous V-polygons 5, namely eight in number. Additionally to the H-polygon 4, above within the convex polyface 2 according to FIG. 33, it has an Additional H-polygon 4, here as a quadrat. The convex polyface is a portion of said polyhedron 62 being a part of a dense packing of these polyhedra and, of cubes of which the top is the additional quadrat. The convex polyhedron has rectangular polygons for the four of the eight V-polygons 5 of the convex polyface 2—unlike the everywhere quadratic right-angled polygons of a rhombicuboctahedron. Unlike this one, it has the proportions of a diagonal face between two edges and two face-diagonals of a cube, that is, like a paper sheet in A format.

In a completely folded ply sheet in FIG. 36 and also still in FIG. 45 representing the next example, respectively two basins of two Additional H-polygons are separated by two table-mountain shaped faceted bumps indeed. At the same time however, they are connected by a valley between these faceted bumps. The bottom of the valley represents the fold line of a horizontally running fold like a roof's valley seen from above.

The both blanks in FIG. 34 are not only congruent, such as those in FIGS. 3 and 11, but also chiral. The mirror axis thereof, rendered as a dashed line, crosses, at an angle of 45° to its X-axis or Y-axis within the X-Y-Plane, the origin of the coordinate-system's cross situated between both blanks. But because two of the four sides of an outline 9 of each of both blanks should be aligned and adjusted to the conveying direction, both blanks are shown in a position to each other shifted away from the position being exactly mirror-symmetrically in accordance with the dashed symmetry axis. The pictogram on the coordinate-system's cross in FIG. 34 makes recognize that here the one blank can be transformed into the other one by mirroring it in the X-axis enlarged here in bold and additionally, by rotating it 90° in the Z-axis according to the spin arrow.

Because of the two Loose segments 6, 6 per hole, the more than twofold rotational symmetry of the hole's outline within the plane blank in FIG. 34 is reduced again at the cleft-ends to a twofold one in all, in contrast to FIGS. 3 and 11 but equally to FIG. 54 later. The respective number of regularly arranged cleft-ends 17 indicates a four-fold symmetry in FIG. 34, a threefold one in FIG. 54.

The two folding objects 24, 24 in FIG. 35 and also the ply sheets 28, 28 formed thereof in FIG. 36 are only chiral once again, that is, no longer structurally identical like the folding objects in the example in FIG. 29. The reason is that only holes having a purely, actually twofold mirror-symmetrically shaped outline within the planar blank, without any indication of a threefold symmetry or a four-fold one in the arrangement of cleft-ends 17, result at all in structurally identical folding objects and structurally identical completely folded ply sheets of a folded structure. Mutually chiral indeed are additionally the two folding objects for wave structures in FIG. 4 and in FIG. 12, of which the blanks' holes have mirror-symmetrical outlines.

The two right-angled Loose segments 6 at each hole of both folding objects 24, 24 in FIG. 35 shall occupy an Additional H-polygon of the system surface of the completed ply sheet. Unlike the Loose segments 6 in FIG. 12, which can be carried along at the same time due to an elsewhere definite folding mechanism being quite simply on a plane ground, the Loose segments aren't yet folded here intentionally, that is, here, they are still coplanar here to the segment they cohere with. So, they protrude rigidly downwards, that is, so as to avoid a collision of the Loose segments to one another within one and the same plane. A collision would be unavoidable if the horizontal alignment would be maintained by folding the loose segments.

The two rectangular Loose segments 6 of a hole within a planar blank, which can be seen then drawn out respectively near both completed ply sheets 28, 28 in FIG. 36 border to each other on a mid-slit-chain 40 consisting here of only one straight slit 32 between two key-points 21. Two gap-borders 39 of the blank in FIG. 34, each consisting only of one straight border-edge-section 13, have coincided in such a straight slit.

The four segments 6 being initially Loose segments 6 in two blanks are joined to each other within the completed folding-structure component 34 in FIG. 37 and, arranged together again like the top parts of a closed quadratic folding box, wherein, in the middle of both slits 32 as mid-slit-chains 40 and as parts of the two superimposed slit-configurations 30, these slits 32 cross each other at the mid-crossing-points 41 of these slit-configurations 30, as can be seen in FIG. 38 above on the right.

The second completed folding-structure component 34 in FIG. 38 is structurally identical to that one 34 in FIG. 37. This one in FIG. 38 is merely turned upside down.

Within the wireframe, fragmentarily shown in FIG. 40, of the newly spatial pattern of the four-ply cell structure in FIG. 39, the pattern being composed of two relief patterns, said cells 65 have the shape of a tetrahedron. The diagonally running cross-sectional cut 66 shows only in an oblique view these cells as triangles standing on the tip. The cross-sectional cut 67 running in Y-direction shows these cells 65 as small quadrates standing on the tip, equally only schematically and skewed because of the oblique view.

In the wireframe renderings, the distance of the ply sheets lying directly on top of each other was ignored for the sake of simplicity.

In FIG. 41, in cross section B-B of the four-ply cell structure in FIG. 39, this cut running in Y-direction is rendered undistorted then; it shows all four ply sheets 28 of the four-ply cell structure, including the hatched quadrates of the tetrahedron-shaped cells 64, the quadrates standing on the tip. In a not rendered cross section C-C, these four ply sheets would be all in close contact within a vertical cross-sectional plane C-C indicated in FIG. 39, in parallel to the cross-sectional plane A-A, everywhere excepted on the border. They would have all the trapezoidal profile pattern of the only single ply sheet of cross section A-A in FIG. 32. This cross section C-C runs through the already mentioned zone of segments that make this cell structure only moderately torsion-resistant as a single one.

FIG. 42 shows, as a whole, the surfaces of three relief-elements 69 of a double-ply folded structure according to FIG. 37, the elements being exactly attached at an angle one to another along element-butt-joints 68. Because this double-ply folded structure, as a pre-product for these elements, is not as stiff as a wave structure, these elements cannot be applied as self-supporting ones without a second layer or a supporting skin layer in the front or behind.

FIGS. 43 to 50 on another sheet show the second example of a four-ply cell structure, having here few polygons per basic unit of the relief pattern. Because the quadratic convex polyfaces of the relief pattern are turned each within themselves in the Z-axis away from the directions of the underlying quadratic grid, there is, in contrast to both precedent examples, not any mirror symmetry in the relief pattern, but only a rotational symmetry—this one however being equally four-fold.

The basic unit 1, shown in FIG. 49, of a relief pattern of a ply sheet shown 28 shown in FIG. 45 has again faceted bumps being oriented uniformly upwards. As can be seen below drawn to the front in FIG. 46, the basic unit has here exactly the same polyface 2 as a base as the basic unit in FIG. 25 of relief pattern of a ply sheet in FIG. 30 has, showing there faceted bumps being oriented bilaterally alternatingly upwards and downwards.

The holes of the planar blanks 8, 8 of both examples, in FIG. 43 as well as in FIG. 28, have a purely twofold symmetry. The blanks belonging respectively together are equal in both cases, that is, not mirror-symmetrical to each other. Merely, they are positioned to each other in a position rotated ca. 90° in the Z-axis. Unlike FIG. 28 however, regarding the initial material thickness would result in a parallel offset of the lines 12, 13 in FIG. 43, whereby the two complementary blanks, as always in the case of a double-ply folded structure for a four-ply cell structure, were no longer structurally equal. The provision for material thickness will be described later.

At least however, FIG. 44 and FIG. 29 have in common additionally that the corresponding folding objects 24, 24 respectively have differing silhouettes 26, 27 in X-direction, that is, within the conveying direction as a direction of projection. Accordingly, only finally the silhouettes 60, 61 of the completed ply sheets in FIG. 30 and FIG. 45 are equal again.

Because of this, also here, in the case of a continuous production from a rolled sheet material, two different folding tools are needed for folding. In the case of a discontinuous production of compactly outlined blanks on the contrary, only one folding tool suffices. In this case, each second one of the always equal ply sheets lying on the worktop has than merely to be turned exactly 90° in the Z-axis in order to be put onto another one and, to result together in a double-ply folded structure—presumed that the material thickness can be ignored.

Within one ply sheet 28 in FIG. 45, two short slits 32 on a straight line together form a diagonal line traversing the quadratic Additional H-polygon 4 occupied with two isoceles triangular H-segments 6 as Loose segments. This can be supplementally seen drawn out into the front also in FIG. 46 where the ply sheet 28 on the right of FIG. 45 can be seen above upon that one lying on the left in FIG. 45. As can be seen in FIG. 45 on the far right and on the far left, these short slits 32 belong to different slit-chains 31 of which again, like in the example in FIG. 5 and in that one in FIG. 30, there are only two slit-chains per slit-configuration 30, whereby the sole key-point 21 is situated in the middle of the slit-configuration being rotational-symmetric in an imagined top view. But now, within the folding-structure-component, it is the middle of an Additional polygon 4, numbered in FIG. 46, surrounded by polyfaces, where the both slit-configurations 30, only one of them being highlighted in bold and identified, cross over each other at their respective key-points 21 in the way that can be seen in the second, the right-hand folding-structure-component in FIG. 47, drawn out above to the rear.

In contrast to the precedent example of the folding-structure-components in FIGS. 137 and 38, the completed folding-structure-component 34 in FIG. 46 is not structurally identical to the completed folding-structure-component 34 in FIG. 47. The second folding-structure-component 34 of it in FIG. 47 is defined geometrically by mirroring the first one in FIG. 46 in the Y-Z-plane. Besides, this second folding-structure component is already laid from the top to the bottom in FIG. 47. This is made by rotating it 180" according to the spin arrow in the Y-axis in FIG. 46. Mirroring geometrically means retrospectively actually a folding process differing from the rendering of the folding state in FIG. 44. This reverse folding process not being rendered, of two laid out blanks shaped just like the planar blanks of FIG. 43, where all valleys and ridges have to be provided to be interchanged however to obtain the two unequal ply sheets and folding states for the second folded structure being unequal to the first one because it is chiral.

Therefore, the two plane blanks have to be folded this time into ply sheets in such a manner that their faceted bumps are no longer oriented upwards as in FIG. 45, but downwards.

As has been mentioned, a portion of the wireframe of a completed folding-structure-component 34 defined by quadrates is shown in FIG. 46 drawn out into the front, The cross-sectional cut 70 of FIG. 47 shown near the side of this portion forms, along with a an equally shaped, only differently located cross-sectional cut 71 of FIG. 47, then together in FIG. 50 a cross-sectional cut 72 of the spatial pattern being there equally fragmentarily rendered, of the four-ply cell structure 63 rendered in FIG. 48 by intransparent faces. Even if they are shown again merely skewed, the inclusions of this cut 72 appear again as quadrilaterals standing symmetrically on the tip. This time, these quadrilaterals are lozenges as cuts of an initially regular tetrahedron having been stretched in Z-direction.

Due to its cells, the four-ply cell structure in FIG. 48 is equally principally robust, that is, bending-resistant and torsion-resistant. The more indirect conduction of the forces makes this folded structure slightly more yielding than the folded structure in FIG. 39, when made of an equally shear-resistant initial material. This applies also to the next example with H-polygons that are arranged within a rotation-symmetric relief pattern and have the shape of a triangle instead of a quadrat.

FIGS. 51 to 60 concern the third and last example of a four-ply cell structure—here only threefold symmetrical. It equates to the preceded one in so far as a basin is surrounded rotation-symmetrically by faceted bumps also here. This time, the basin has only three vertices; so it is surrounded only by three faceted bumps.

Because of the trigonal geometry, the longitudinal section in FIG. 51 shows an asymmetrical profile pattern like in FIG. 9. Besides, it is different from the transverse section in FIG. 52. In distinction from the quadratic geometry the H-polygons 4 and the convex polyfaces according to FIG. 52 are smaller in relation to the depth of the relief pattern, which thus is more compartmentalized here. Besides it has a threefold mirror-symmetry too, as can be seen in FIG. 52 in the top view of the relief pattern of a portion of the ply sheet of FIG. 56. The pattern is more simple than that one of both fourfold symmetrical examples before. The corresponding folded structure including its arrangement of slits is going to be described only now because it is more difficult to comprehend.

The reason is that in this case there are not only some H-polygons 4 that are occupied with two coplanar neighboring segments 6, but there are additionally also all V-polygons 5 that are occupied with two coplanar neighboring segments 7. Besides, the segments 7 converging pairwise respectively at a slit 32 within a ply sheet 28 in FIG. 56 are shaped differently while the isoceles trapezoid of a V-polygon 5 according to FIG. 53 is occupied with a smaller V-segment 7 shown in the blank in FIG. 54 and having the shape of an isoceles triangle and with a larger segment 7 having the shape of a lozenge. Unlike both triangular right-angled, mutually mirror-symmetrical, small H-segments 6 per only still each second Additional H-polygon 4, the two differently shaped V-segments per V-polygon are not Loose segments however; instead, they are integrated within the continuous net between node points 15.

The imagined hexagonal grid of the both planar blanks 8, 8 in FIG. 54 including a node points 15 being trivalent here corresponds to the tree-fold symmetry of the arrangement of slit-ends 17 and slit-borders 19 in the outline of the holes 14. Here, not only chains 10, 11 of polygons running within two directions cross each other. A third chain representing a third direction could be rendered here additionally. The area of crossing comprises several polygons here.

According to FIG. 55, the V-segments rotate during folding in states as folding objects 24, 24 here more than in all other examples because wide clefts between them have to be closed. In this case, a hole recalls somewhat an iris diaphragm. Unlike this, the segments fold together and fold up into the height instead of overlapping flat. During the folding process, all equilateral triangular H-segments 6 of the future basins not being halved by a slit make a turn of 60° in the end, in relation to the upper H-segments of the faceted bumps.

The crossing slit-configurations 30, rendered drawn out respectively on the left, of the folding-structure-components 34 in FIGS. 57 and 34 in FIG. 58 show that their respective single key-point 21 is here again neither the middle of a H-polygon nor the middle of a slit-configuration 30. Instead of this, two slit-configurations 30 cross each other at their side-crossing-points 42 in one of the vertices 73 of a triangular Additional H-polygon 4 according to the relief pattern in FIG. 52.

Because of its equal silhouettes 26, 27 in X-direction, the chiral folding objects 24, 24 in FIG. 55 need only one single folding tool for a continuous production.

The completed, threefold mirror-symmetrically and rotation-symmetrically patterned folding-structure-component 34 in FIG. 58 is structurally identical to its counterpart 34 in FIG. 57. Thus, in a continuous production process, simply each second component 34 is laid upside down according to the spin arrow in FIG. 57 in order to be laid upon the first component 34 to be conjoined in an interlocking manner.

While the relief pattern of the single folding-structure-component was still additionally mirror-symmetrical, that one of the four-ply folded structure is only rotation-symmetrical. Due to the triangles being H-polygons instead of quads however it is even less yielding than that one in the preceding example.

In FIG. 60, the imagined fragmentary wireframe of the edges of the four-ply cell structure of FIG. 59 shows that the enclosed cells 65 have the shape of an octahedron lying upon a H-polygon as a triangular face of an octahedron. Additionally, the equally lozenge-shaped contact-faces 64 of the mutually facing surfaces of the folding-structure—in lightweight design components from FIGS. 57 and 58 are rendered visible in FIG. 60. From a mathematical point of view here, the contact-faces are each the cut set of two V-polygons 5 of these mutually facing surfaces. The V-polygons are superimposed only in parts, that is, they overlap only in parts instead of being aligned and, of coinciding.

Four-ply cell structures are robust and effective due to their cohesion being extending in detail as well as a whole if the initial material is not notably resistant. Additionally, the multiplicity of plies makes the folding edges comparatively rigid.

Even so, there is an option to spare two ply sheets in the case of a cell-structure forming voids so as to abbreviate the production process. However, the possible number of relief patterns having only two ply sheets is probably more limited. The reason is that such a "two-ply cell structure" is far more difficult to conceive because the mutual bridging of the slits 32 by V-segments 7 has to be attained within one and the same V-polygon 5 as a contact-face 64 between respectively two faceted bumps occupying respectively one convex polyface 2 of both still needed ply sheets in order that there are not any unbridged slits running from upside to downside.

FIGS. 61 to 69 concern a folded structure being a two-ply cell structure that is formed of only two ply sheets.

Figure 67:
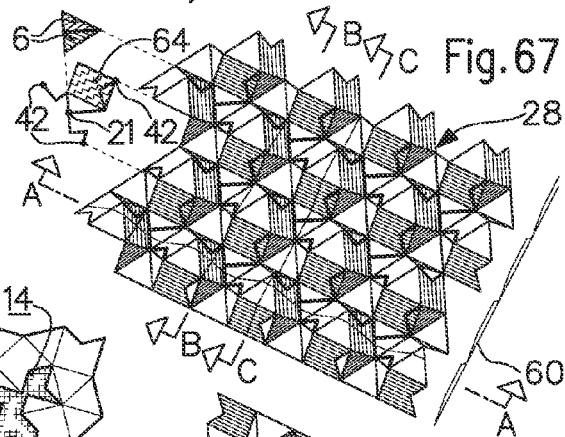
FIG. 67 shows the blank of FIG. 66, folded completely into a ply sheet.

FIG. 61 shows, in longitudinal section A-A of the ply sheet of FIG. 67, an uniform trapezoidal profile pattern being a polygonal chain of the cross-sectional cut of a completed ply sheet. Here, this polygonal chain has horizontal portions being equally long above and below. The upper small portion of the polygonal chain is the cross-sectional cut of one side of an upper H-segment belonging to a faceted bump, the lower one is the cut of an Additional H-segment of a triangular basin between three hexagonal cassettes.

The relief pattern shown in FIG. 62 not only by a basic unit 1 but also, as a part of the top view of the upper surface of the ply sheet 28 of FIG. 67, but without slits, causes, as will be demonstrated later, an extraordinarily regular and symmetrical spatial pattern for a two-ply cell structure. The profile patterns of cross-sections B-B and C-C show how simple and complicated in same time this structure is.

Figures 63, 64:
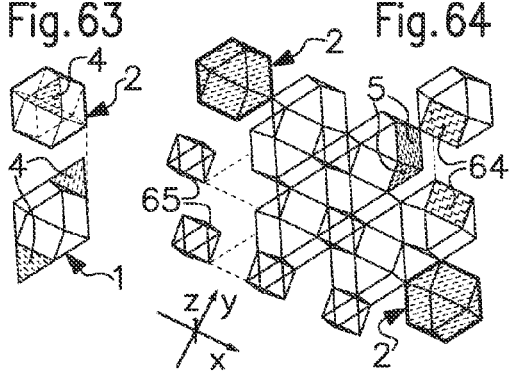
FIG. 63 shows an oblique view of the basic unit of FIG. 62, with a convex polyface as the upper half of a hexaoctahedron whose lower half can be seen dashed.
FIG. 64 shows in some parts the imagined wireframe of the edges of the two-ply cell structure from FIG. 69.

The convex polyface 2 in FIG. 63 is the upper half of a hexaoctahedron being a semi-regular convex polyhedron. Due to this geometrical base, one could again interconnect inconspicuously three not rendered relief-elements of which the zero planes are positioned one to another at an angle, as larger portions of wave structure that is made without voids of a ply sheet 28 and of a not rendered mirror image thereof having the relief pattern according to FIG. 26. In doing so, the three zero planes would intersect in lines as edges of a tetrahedron-shaped built envelope or, of a octahedron-shaped one. Indeed, the convex polyfaces 2 being oriented openly upwards or downwards have not even few sides, that is, six sides on the base. But compensating this here, there are not any additional points on the base's sides that represent the right-angled or acute corner of the border of a neighbored convex polyface like in the two examples showing relief patterns of a four-ply cell structure.

The equilateral triangular V-polygons occupied with respective V-segments form completely the cells 65 according to FIG. 64. Also here, the hollow closed cells 65 have the shape of an octahedron lying upon a horizontal triangular polygon. In the front on the left, a hexagonal convex polyface 2 being hatched with dashed lines is oriented downwards, thus open above. An additional hatched convex polyface 2 in the rear on the left is oriented upwards and open below. In between, other convex polyfaces having these both orientations overlay one another—rendered again only as a wireframe.

Like in the precedent example of a four-ply cell structure the spatial pattern of the two-ply cell structure shown here, the pattern being formed of two relief patterns, is advantageous also by the reason that it is no longer restricted to rotational symmetry but shows also mirror symmetries. This makes each of both examples of a folded structure very torsion-resistant separately, without planar skin layers, particularly since here, aligned horizontal fold lines traverse the whole structure within the upper and the lower plane in parallel to the zero plane. The zones without cells in the two-ply folded structure having a trapezoidal profile like in cross-section A-A are not folded in parallels. Instead, they show in top view a configuration of triangles where the quads located between them are arranged like the diagonals of a truss girder.

Figure 65:
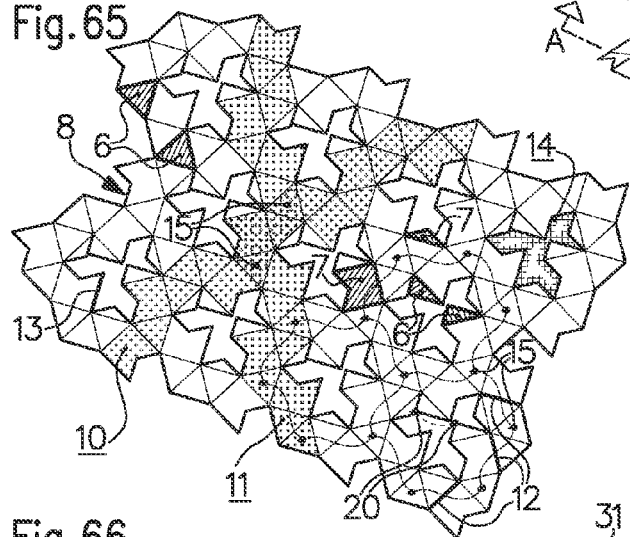
FIG. 65 shows a planar blank for a two-ply folded structure from FIG. 69, with holes and fold lines.
Figure 68:
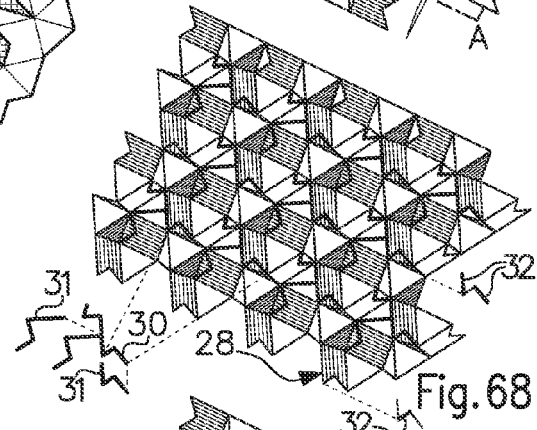
FIG. 68 shows a blank having been folded mirror-symmetrically to that one in FIG. 67, turned upside down.

FIG. 65 shows only one single planar blank 8. The second, congruent, not shown blank being needed for the two-ply cell structure is mirror-symmetrical. Thus, the corresponding ply sheets, one of them 28 rendered in FIG. 67 and the other one 28, in FIG. 68, are chiral. The blank in FIG. 65 has a very similar hexagonal net meandering in each mesh between node points 15 as well as the same H-segments 6 as the two blanks in FIG. 54. The difference consists in the V-segments 7, which occur here, as formats, on one hand as an equilateral triangle occupying then a whole equilateral triangular V-polygon, on the other hand as both a flat small isoceles triangle and a pentagon having one concave corner occupying then together side by side a quadratic V-polygon.

Figure 66:
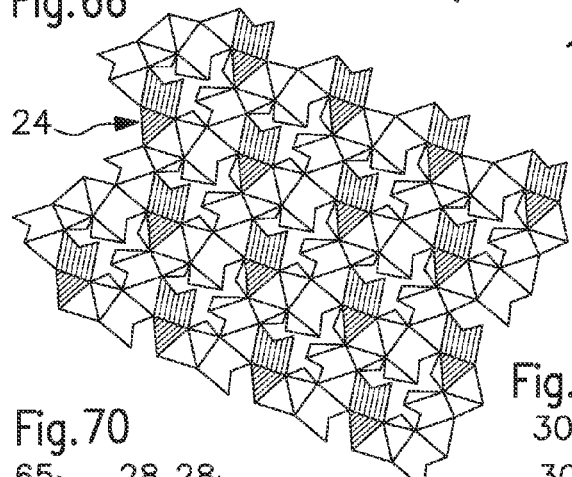
FIG. 66 shows the blank of FIG. 65 in folding state.

The temporary folding object in FIG. 66 demonstrates once more, by the constancy of the mutual correlation of all parts even during its shortening in X-direction or Y-direction and its extension in Z-height, that the spatial folding process works geometrically exact, thus without restraints.

Figure 69:
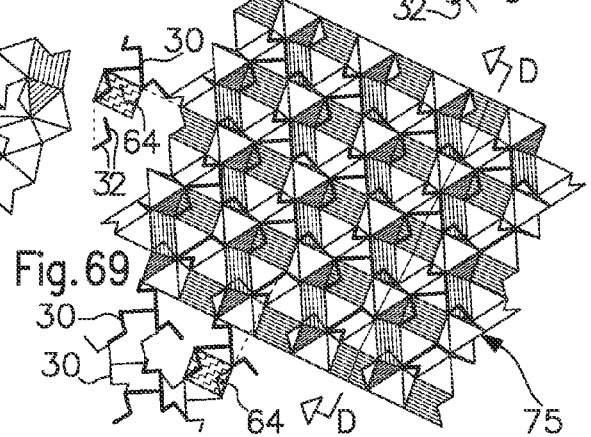
FIG. 69 shows a two-ply cell structure having been composed of the ply sheets in FIGS. 67 and 68, having a threefold rotational symmetry and, having few segments per area as well as, per basic unit of the relief pattern.

The shape and the arrangement of the slits and of the ply sheets for the two-ply cell structure 75 in FIG. 69 is rendered in FIG. 67 by the lower ply sheet 28 and, in FIG. 68 by the upper ply sheet 28. Each quadratic V-polygon of a ply sheet 28 that is congruent to a contact-face 64 according to FIG. 67 is traversed in parts by a polygonal chain of two short slits 32, 32 according to FIG. 68. Three times in FIG. 67, such polygonal chains are arranged rotation-symmetrically around both each upper equilateral triangular H-segment of a faceted bump and each equilateral triangular basin regardless whether this basin comprises two H-segments 6, 6 or only one H-segment.

The cross-sectional silhouette 60 of the ply sheet in FIG. 67 is, as well as the not rendered one of the folding state, very distinctly serrated. This facilitates folding with a folding tool.

The ply sheet 28 in FIG. 68 is chiral to the ply sheet 28 in FIG. 67. Its lower side is laid upside. So, the faceted bumps are opened upwards. That is to say, the mirror image to be imagined has been shifted and rotated 180° in the X-axis. So, the triangular Additional H-segments are now above between the hexagonal faceted bumps being oriented downwards. Hereby, a plane pattern of empty hexagons and filled triangles results in top view.

The two planes of triangles between hexagons of both ply sheets of a completed two-ply cell structure 75 like in FIG. 69 are the top chord layer and the bottom chord layer of a material-saving, periodically spatial folded-plate structure, of a space-fold-structure, which looks like a flat space-frame in the rendering as a wireframe in FIG. 64.

The slits rendered drawn out of the ply sheets in FIGS. 67 and 68 indicate that the key-point 21 is, like already in FIG. 58, not in same time also the middle of a H-polygon or, of a slit-configuration 30. Differing from FIGS. 38, 47 and, 57 of the precedent examples of folding-structure-components being halves 34 of a four-ply cell structure, two slit-configurations cross no longer at all over each other here. Like in the case of FIGS. 38, 47 and, 57 in addition to the crossing-over, they touch one another merely at the vertices of polygons, which are here now everywhere the vertices also of a quadratic V-polygon of which the surface area serves as a contact-face 64 between two faceted bumps of different ply sheets.

FIG. 69 shows that, instead of only a part of the surface area of a V-polygon, here the entire surface area of the here larger, quadratic V-polygon is used as a contact-face. But not all of the V-polygons are still used for the junction of the two closely fitting ply sheets enclosing voids in same time. The reason is that the two short straight slits 32 between two V-segments of one ply don't run here along an edge between polygons in order that the bridgeover of slits can be performed within each quadratic V-polygon.

Figure 62:
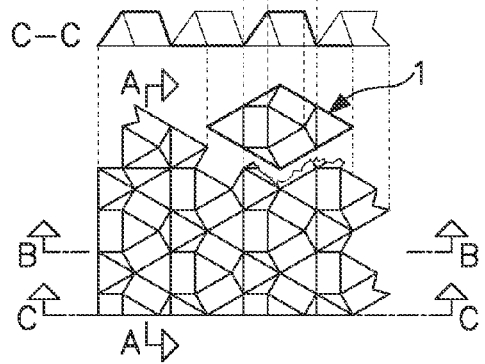
FIG. 62 shows two cross-sections of the ply sheet from FIG. 67, and below: the top view of the basic unit of its basic unit as well as of this ply sheet itself in the part on the left side of the cross-sectional plane C-C from FIG. 67.
Figure 70:
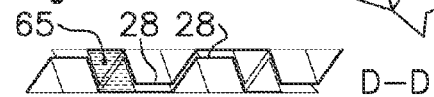
FIG. 70 shows a cross section of the two-ply cell structure in FIG. 69.
Figure 82:
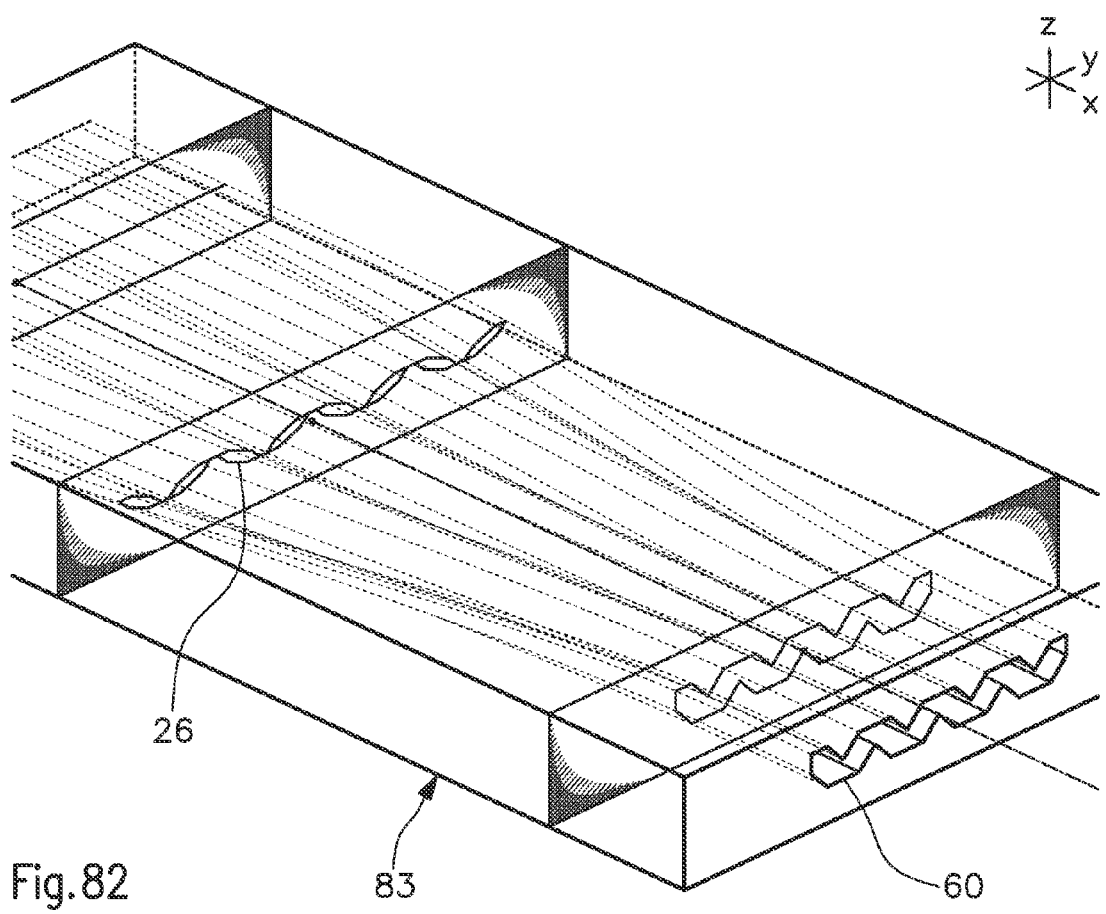
FIG. 82 shows a folding tool for folding continuously a planar blank as a folding object, by taking the example of a folding object being oriented like shown in FIG. 29 on the right.

Cross-section D-D in FIG. 70 of the completed cell structure 75 shown in FIG. 69, is located, in relation to the relief pattern, in the same plane as cross-section C-C shown in FIG. 62 of the separate ply sheet included in it. The cross-sectional cut of cross-section C-C is shown twice in FIG. 70, that is, a second one above, rotated 180°. One cell 65 is indicated by a void being hatched with dashed lines. Like already in the cross-section in FIG. 41 of a four-ply cell structure, also here, the ply sheets are rendered without any material thickness but they are rendered spaced apart in the height such that they can be distinguished despite they fit closely indeed.

By FIG. 70, the depiction of folded structures without a notable material thickness is concluded.

The following is about considering the material thickness in detail with two different examples. FIGS. 71 to 75 show on one drawing sheet, as the first one of these two examples, the formation of a portion having been cut off from the upper corner of the left, the first ply sheet 28 of a wave structure as shown in FIG. 30. This portion has a conspicuous material thickness, which can be seen by being hatched in the plane area of the diagonal cut. These figures show as well their doubling into a ply sheet. No longer such a thickness can be left out of consideration, compensated on folding lines by restraint, slight deformation, or, by areas made yielding.

The example with material thickness starts from the precondition that the plane blank 8 in FIG. 71 is cut off from a plate material that has a sandwich layer structure in a small scale itself where a comparatively exact fold hinge occurs, consisting of the respective skin layer having been remained after cutting simply perpendicularly into it from one side only and, in omitting any mitering.

So, in the state as a folding object 24 in FIG. 72, the folds along the fold lines gape open in profile into V-profiled slits.

The first ply sheet 28 in FIG. 73 and the second ply sheet 28 in FIG. 74 are structurally equal, like both ply sheets in FIG. 30. In FIG. 75 however, they are put one upon the other differently from FIG. 31.

The periodically patterned system surface of the relief pattern, hitherto defining directly all entities without regarding the material thickness, is the base for the geometrical construction of the plane blanks having a material thickness. Generally, only the mutually facing surfaces touching for a tight junction of two ply sheets are those ones that are located in the here continuously common, periodically patterned system surface of a completely conjoined folded structure of at least these two ply sheets.

In constructing geometrically the first blank, the plane of each polygon 4, 5 of the system surface has to be offset now by the everywhere equal amount of the material thickness—into a direction respectively perpendicularly to this plane—in parallel downwards so as to obtain the planes of the second, lower surfaces of the segment occupying this polygon in their position in a completed first ply sheet of a folded structure and, so as to adapt then the proportions of the segment within the blank according to the lines of intersection of the new planes obtained as a result, in order to avoid a purely theoretically thinkable superimposition of two cut edge faces in the zone of the fold line as it can be seen surrounded by a circle in FIG. 62 on the far left.

Because the fold-lines' joints gaping as a V-shape need space, the dimensions of the segment-surfaces are slightly smaller or larger than, or different from, those ones of the corresponding polygons of the system surface. Besides, as can be seen in FIG. 75, the superposed surfaces of two segments of different ply sheets don't touch each other within a narrow zone on the border of the segment because the two corresponding straight border-sides of these both segments are located next to, or upon, each other slightly offset in parallel. In so far, the continuous two-dimensionality of a folding-structure's ply sheet is limited by the locally relative diminishment, and enlargement, of the two-dimensional extension of the segments in contact and, by the offset of them to each other, resulting thereof.

Thus, the entire extension of the segments occupying polygons, as well as the continuity of a folding-structure's ply sheet, is limited as a quality to the segments adjoining without gaps anyway over the whole length at lines of folds and of slits and, not being cut in a mitred manner, but in a tight-angled one, along the edges having been cut only at one side or cut trough completely. It is limited as well by the continuity of the periodically patterned system—surface of polygons which are all occupied with segments. In a ply sheet, all segments meet edge to edge linearly; they cohere all as a whole on their folds, and they don't leave a gap along any fold. Small holes having the dimensions of the material thickness remain only at the vertices between the edges or joints.

The material thickness of a ply sheet doesn't extend centrically from the system surface, but only towards one side, only downwards in a ply sheet 28 being single in FIG. 73 and later being located below in the folded structure. So, the polygons of the system surface of the relief pattern, which are occupied with segments there, are underlaid, that is, not overlaid like in FIG. 74.

Because of the one-sideness of the material thickness, the faceted bumps become alternatingly more obtuse or more acute than within the regularly polygonally periodically patterned system surface. Thus, the H-segment 6 being quadratic here, occupying respectively a constantly equally sized H-polygon, becomes smaller and larger alternatingly. The periodicity and continuity of the planar blank as well as of the intermediate states during folding, for which each only one single such state is rendered in FIG. 72, remains unchanged. The segments touch each other furthermore like within the planar blank in FIG. 71 where the fold lines don' gape yet as a V-profiled joint having two sides.

By cutting into the plate material, the fold line 12 develops into a surface-cut-line 76 and then also into one cut-face 77 with a thin oblong linkage 78 remaining in this situation as a fold hinge, reduced here to the hinge's rotation axis. During folding according to FIG. 72, the surface-cut-line 76 cleaves into two segment-surface borderlines 79 on the side of the fold's ridge, here being above, wherein two edge-cut-faces 80 appear at each fold. To each parallel offset of segment-surface borderlines 79 and to each rotation of edge-cut-faces 80 in profile away from the system surface's thin lines into one direction of the coordinate system corresponds, at another place at the border of the same hole 14, an opposed offset with the same value, of a line or of an opposed rotation—due to the rotational symmetry of the hole. So, the preservation of the parallelism of lines ensures also here in respect of the material thickness the maintenance of the needed continuity of the folding-structure's ply sheet without restraints on folds and without remaining warping deformations of segments.

For the sake of simplicity in rendering, the rotation axis 78 of the hinge between segments is laid at the respective surface of the sandwich panel. However, in the case of fold hinges being living hinges it is actually not so far eccentric. But from a geometrical point of view, the issue is nearly the same. Then, the material thickness has to be taken into account less than it really is.

One of its both identical and initially equally oriented ply sheets according to FIG. 72 has to be turned upside down before being superposed into a wave structure so that the ply sheets touch each other within, or along, the polygonized system surface, despite of their sides being now less regularly patterned. But a rotation of 90° in the Z-axis on a plane ground, as has been made in FIG. 30 on the left in ignoring the material thickness before superposing the structurally identical ply sheets is no longer suitable here. The reason is that a geometrical construction of this ply sheet, following strictly the right-hand, second ply sheet of FIG. 30 line by line—like during the construction of the left-hand, first ply sheet having material thickness in FIG. 73—would result in a second ply sheet having material thickness, but showing the demanded structurally identical image only in the inner area, not on the border where the outline would run than differently in relation to the pattern having now alternatingly large and small quadrates as thick H-segments.

Turning the doublet of FIG. 73 for FIG. 74 from the bottom side to the top, including a rotation of the arrangement of slits 90° in top view, is performed by rotating the doublet 180° in a parallel to the X-Y-angle-bisector as a rotation axis, which is shown finely drawn in the coordinate cross on the left side in FIG. 75. Thus, the rotation axis is here normal to the plane of the hatched cuts. After this rotation, the two ply sheets are put one upon the other in a position shifted to the side concerning their extensions whereby there are continuous one-ply border zones in the completed wave structure 34 in FIG. 75, unlike FIG. 31.

Thus, structurally identical blanks and ply sheets remain structurally identical in a wave structure also in respect of the material thickness. In the case of a four-ply cell structure however, the initially congruent blanks of the two ply sheets of a double-ply folded structure being a folding-structure's component become slightly differently proportioned in respect of the material thickness because cross-sectional polygonal chain of the common, periodically patterned system surface is not equal like in the case of a wave structure with its uniform up and down upwards and downwards whereby the polygonal chains of the cuts of the surfaces being averted from each other, of both ply sheets of a folding-structure's component having a material thickness, have always a differing appearance. Nevertheless, respectively the two inner as well as the outer ply sheets of a four-ply cell structure are structurally identical, if the two folding-structure's components were structurally identical already without regarding the initial material thickness.

All hitherto described matter was based on the assumption that a blank was cut out quasi monolithically from really only one large exemplar of the flat material. Assembling the plane blank of several, if not of a plurality of pieces can be useful equally according to the present invention so as to avoid a lot of cutting waste if segments of a medium size have to be made. In doing this, the butts of the maximally usefully large or anyway available exemplars of the blank's initial material shouldn't follow the fold lines or the holes' border-edge-sections in order that a robust whole is formed anyway after superposing two ply sheets being pieced together, whereby slit-chains are bridged by extending overlaps also here.

At the extreme, instead of a favoured fold hinge of the blank's material, each fold line as a rotation axis can also be itself really an additionally mounted hinge, e g. a piano hinge of metal. Then, really a large mat, of individual solid pieces as segments having quite large dimensions of ca. 30 cm, e. g. of plywood, corresponds to the planar blank.

Also the cubic folded structure shown in FIGS. 76 to 81 as the next and last example of a folded structure being equal on both sides can be assembled of segments, instead of being subdivided into segments. The cubic relief pattern applied to it as a geometrically extreme case is feasible in respecting any material thickness, however small it may be, already only by the reason that flat stacking the completed object like in the case of an egg carton is principally impossible. It concerns a folded structure conceived to stand as a room partition shelf. The folded structure has V-segments belonging to right-angled polygonal bumps and being oriented normal to the zero plane. The polygonal bumps are checkerboard-like arranged and serve as a cubby. The diagonal arrangement of the cubbies in relation to the shelf's border can change into a rectangular one if, instead of a subdivided blank, really a mat assembled is conceived, of which the format causes only little cutting waste also in this case.

The mat lying still flat at first is folded up and hereby folded upwards into Z-direction, as an object of a quite limited size still able to be handled by several hands. Two completely folded ply sheets are finally connected by four screws respectively segment by segment tightly but detachable. After that, they are erected as a whole.

The alternatingly oriented convex polyfaces, each shaped as a halved cube instead of a truncated pyramid, can be considered in mind also as a frustum of a pyramid having infinitely steep side faces and an apex in the infinite.

The clefts 81 having parallel sides and being parts of the holes 14 of the planar blanks in FIG. 76 are necessary because the space for a fold cannot be occupied twice as it is geometrically possible in a model without material thickness.

Unlike the pyramidal counterpart with a folding object 24 in FIG. 72, a ply sheet of the cubic relief pattern must be folded in two separate fold processes according to the folding object 24 in FIG. 77 and the same folding object 82 in an additional different folding state in FIG. 78. The separation is caused by a necessary change of the folding direction. The blank 8 in FIG. 76 cannot be simply pushed together as a whole in one process from only two or from all four border sides. At first, in a geometrically simple manner, the folding process according to the intermediate state in FIG. 77 takes place, similar to the production of corrugated cardboard. At the not rendered end of this first folding process, the rows of the segments being shown here oriented obliquely in relation to the zero plane stand upright. The following folding into the state according to FIG. 78 can be initialized by two toothed laths approaching each other from two sides. Then, the folding object can be pushed together from merely two corners until the holes are closed.

The right-angled blank is only still a two-dimensionally acting folding mechanism—no longer a spatially acting one as in the examples before.

That which follows concerns once again folded structures of small and medium size with conical polygonal bumps, the structures made of blanks not being pieced together—now in respect of mechanical material properties for their serial production, be it by cutting and folding the blanks piecewise as clearly defined items being customized when necessary or, be it continuously as seemingly endless rolls.

Since wave structures as a folding mechanism having effectively only one degree of freedom work on a plain ground very easily only with absolutely stiff segments and absolutely articulated fold lines as can be seen in FIGS. 71, 72 and, 73 in an idealized manner on one hand and, since cell-structures have more degrees of freedom and rely hereby on more than simply a plain ground as a duct on the other hand, the folding process cannot be induced by turning merely two neighbouring segments to each other. In addition, nearly each blank according to this invention has to be moved at many places so as to support the folding process.

Certainly is would be possible to fold the blank as it is usual in the case of a Miura folded structure. However, the special geometry of a folded structure enables another process:

In contrast to Miura folded structures, which—within the terminology of this specification—comprise only V-segments, the structures according to the present invention have also H-segments. During the folding process, the H-segments remain constantly horizontal while the V-segments angle themselves gradually in an oblique position. Equally in contrast to the Miura folded structures having principally a straight-line silhouette of the projected upper and lower edge, some folded structures have a distinctive zigzag within the silhouette 26, 27 of their folding objects in intermediate state as well as silhouettes 60, 61 of their completed ply sheets. This applies where the convex polyfaces have large H-polygons on their tops and where they enclose many large Additional H-polygons whereby the V-polygons get more distance. This distinctive silhouette can be used to conduct the blank during folding. In doing this due to its property of a folding mechanism, folding up the folding object in transverse direction causes then automatically folding up in longitudinal direction wherein folding is not hindered by geometrically conditioned inner restraints, in contrast to a Miura folded structure.

To support the folding process during production, the blank passes a folding tool 83, having a zigzag clearance outline being changing, that is, narrowing in with and increasing in height. This folding tool is rendered in FIG. 82 in a simplifying manner as a tunnel within a solid block made transparent however. It is formed as follows:

Like a ventilation duct with a change of profile dimensions, it is an oblong duct, of which the clearance outline changes along the path after an initial constancy. At its beginning, the clearance profile is totally flat and very large. At its end, it has the shape of the silhouette 60 of a side view of the completely folded ply sheet seen from the direction of conveying the whole blank during production. In between, the silhouette 26 of the folding object intervenes in an intermediate state—here that one of FIG. 29. The finely dashed, curved lines as a set of paths of this profile's outer and inner corners being formed to be increasingly distinct, begin and end each as a straight line and run continuously in between, due to a S-curve connecting the straight beginning and the straight end tangentially, that is, without offsets, folds or, immediate changes of curvature, such that the temporary, unavoidable elastic warping within each segment is minimal during folding. For the sake of simplicity, the folding objects 24 are rendered in the Figures without the temporary warping within the folding tool; Otherwise, each folding object would have to be folded more strongly on its right-hand side than on its left-hand one.

The silhouette 26 of the left-hand blank 24 in folding state in FIG. 29 has, as well as that one in FIG. 4 distinctive zigzag pattern. That means that its prongs each penetrate the zero plane due to their large height whereby they are able to make the V-segments deflecting, swinging out and, turning out of the zero plane where the V-segments were still lying horizontally at the beginning of the folding process. Hereby, they are also able to shift the H-polygons upwards or downwards, that is, in Z-direction Other silhouettes are less distinctively serrated such as that one 27 of the corresponding right-hand blank 25 in FIG. 29. The same applies especially to all folding objects of cell structures, which are even especially relying on a good conduction, but which have below—excepted the not useful silhouettes of protruding Loose segments—a completely straight-line silhouette that doesn't offer possible grips for folding. That is why, from a production-oriented point of view, the plane periodical patterns should be aligned in relation to the conveying direction such that they show an especially distinctly formed profile in a cross-sectional plane running across it.

In a not rendered case where the prongs in the tool don't penetrate the zero plane according to the silhouette, the silhouette as an initially straight-line slit has to become at first artificially a flatly serrated slit in order to make the segments anyway swinging out of the zero plane and, in order to hinder the faceted bumps going to be formed, from snapping trough downwards. This doesn't apply if the folds were prepared, that is, embossed or shrunk on one side in such an manner that the segments turn and lift themselves somewhat out of the zero plane, to evade a prestress caused by this.

Equally not shown in a separate drawing is the folding tool especially with the finally above and below continuously straight-line silhouette of a ply sheet of a cell structure. In a folding state according to FIG. 35, the silhouette 60 shows still prongs also downwards, namely as the contours of the Loose segments still protruding downwards intentionally to avoid collisions. These prongs enlarge themselves below in the clearance outline continuously until the clearance outline changing in conveying direction has achieved above the serrated silhouette of the completely folded blank Differing from the shown folding tool, a section of a duct is inserted now between the section of the curved regions of the dashed path lines and the section of a constant profile having the final silhouette. Within the inserted section, the prongs below continue along continuous path lines and diminish by this gradually up to the straight-line lower edge of the silhouette of a completed ply sheet. Finally, the Loose segments are folded with a time lag indeed, but together in the same tool in order to fit closely horizontally to the rest of the ply sheet.

After folding and being sprayed with glue, each of the two ply sheets to be glued can be drawn pneumatically by a relief-shaped mould of a finely perforated metal sheet in order to get then exactly again the right shape after an unavoidable flattening because of still elastically feathering folds. In this process, both moulds fit closely into each other such that all contact surfaces to be glued of both ply sheets touch each other without a strong pressure, and intentional voids of cells are preserved however.

In the case of a continuous process with a fast-acting glue or with hardly stiff folds, each drawing mould is formed as a cylinder having a relief-shaped jacket of finely perforated metal sheet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A three dimensional folded structure that is folded at regular intervals and cannot be folded flat, for use in lightweight design and lightweight construction, the folded structure substantially extending in two directions including a longitudinal direction and a transverse direction, and the folded structure comprising:

a small number of folded ply sheets, each of the ply sheets being folded up in two directions, each of the ply sheets being formed by an originally planar blank of an initially flat material lying in a zero plane and including fold lines and polygonal holes disposed at regular distances, each of the ply sheets being subdivided into a plurality of segments, each in the form of a polygonal planar entity that is, except at a border of the ply sheet, delimited by a small number of the fold lines and a small number of edge-sections of a respective polygonal hole, the segments being so numerous that no more than two holes border on each segment, the ply sheets, in the planar state, being congruent, except for a specially formed blank border or a possible slight parallel offset of the fold lines and of said edge-sections to account for material thickness, the plurality of segments being arranged so as to occupy polygons, side by side, along common fold lines and to line up so as form virtual chains, the virtual chains being arranged to form a virtual net in which the polygonal holes are located in virtual meshes of the virtual net so as to be free of polygons, each ply sheet being folded so as to close each respective polygonal hole into a slit-configuration including at least two slit-chains that meet in at least one key-point and so as to shorten the blank in the longitudinal and transverse directions, the folded ply sheet having, except for the slit-chains, an uninterrupted gapless closed form including a bilaterally relief-shaped surface with a plurality of faceted bumps lined up in several directions of the zero plane, in the folded state, a portion of the plurality of segments being H-segments that are horizontally parallel to the zero plane and a remainder of the plurality of segments being V-segments that are at an angle to the zero plane, and one of both relief-shaped surfaces of each ply sheet being defined by an identically shaped virtual system surface of gapless cohering polygons including H-polygons occupied by no more than two gapless neighboring H-segments and V-polygons occupied by no more than two gapless neighboring V-segments, the system surfaces of the at least two of the ply sheets coinciding at least partially in a regular arrangement by extensive contact of respective surfaces of the ply sheets, the ply sheets being tightly conjoined so as to contact not only entirely over horizontal contact-faces from one H-segment to another H-segment, but also at least partially in obliquely inclined contact-faces from one V-segment to another V-segment so as to provide a gapless folded structure by the at least two ply sheets, the at least two ply sheets being conjoined such that each straight slit provided as a section of a slit-chain of one of the ply sheets is bridged over its entire length by at least one segment of the other of the ply sheets.

2. The folded structure recited in claim 1, wherein the system surfaces, each at one side of two mutually facing ones of the at least twoply sheets, define a common system surface, such that the said two ply sheets form a "double-ply folded structure" with each of the said two ply sheets fitting into each other completely and contacting each other regularly everywhere, and wherein each segment has a surface acting as a contact-face to conjoin said two complementary ply sheets.

3. The folded structure recited in claim 2, wherein the plurality of ply sheets consists of two ply sheets that are completely congruent even when considering material thickness, and where the two relief-shaped outer surfaces of the folded structure have the same appearance including a relief of wave-shaped, regularly alternating protruding and recessing faceted bumps, where the convex polyfaces of a basic unit of the pattern of relief-shaped surface of each ply sheet of this folded structure are arranged in a lined-up manner in at least two directions of the zero plane, wherein respectively two smaller coplanar V-polygons of neighboring convex polyfaces of the system surface of a ply sheet are combined to a larger V-polygon, which is entirely occupied with a larger segment, namely as a portion of two faceted bumps, whereby each original planar blank is a continuous spatial folding mechanism with only one degree of freedom on a smooth surface, and wherein each segment is delimited by no more than two straight hole edge sections.

4. The folded structure recited in claim 3, wherein the said virtual net of the originally planar blanks of both layers presents itself only as a net of quadrilaterals with quadrivalent virtual node points, wherein, between two node points, there is at least one pair of respective fold lines being parallel to each other, wherein the two folded ply sheets are structurally identical, and not mirror-inverted to each other, whereby the folded ply sheets appear the same from both sides, that is, from the top and from the bottom, including the slit image, also when considering the material thickness, and wherein the only end point respectively lies everywhere as the centre of a rotationally symmetrical slit structure exactly in a vertex point between several V-polygons, and wherein, along exactly each fold line of one ply sheet, a straight slit of a slit-chain of the other ply sheet is bridged by exactly two segments connected to each other at this fold line, wherein this fold line lies either between an H-segment and a V-segment or between two V-segments.

5. The folded structure recited in claim 1, wherein the mutually facing faceted surfaces of two conjoined ply sheets interlock in a position that is mutually immovable into directions within the zero plane but that include regularly arrayed gaps therebetween as all-around entirely enclosed voids so as to form closed cells of several segments of both ply sheets, as integral parts of a periodical spatial folded-plate structure called a "cell structure", and wherein multiply regularly several convex polyfaces of the basic unit of the periodically patterned system surface of each ply sheet, each polyface occupied with a faceted bump, enclose, by a part of their borders, an additional H-polygon that is occupied with at least one H-segment, and wherein the contact-face of contacting corresponding V-segments of different ply sheets either extends over the whole surface of a V-segment of only a subset of all V-segments or, it extends over only a sub-area of the whole surface of each V-segment.

6. The folded structure recited in claim 5, wherein the folded structure is made as a "two-ply cell structure" of only two initially planar blanks and wherein the mutual bridging of the slits is attained by V-segments within one and the same V-polygon as a contact-face between two mutually extensively contacting faceted bumps each occupying a convex polyface of different ply sheets.

7. The folded structure recited in claim 2, wherein the structure is composed as a "four-ply cell structure" of two double-ply folded structures initially made separately as folded-structure-components of which, respectively, the two ply sheets are everywhere conjoined, wherein the folded structure includes four ply sheets including two inner ply sheets being part of different folded-structure components and mutually facing so as to conjoin both folded-structure components closely tightly so as to form cells enclosing voids between the two folded-structure components.

8. The folded structure recited in claim 7, wherein the folded-structure components are structurally identical, including the array of slit-configurations within their ply sheets, such that the folded structure components are not mirror-inverted to each other, even in respect of the initial material's thickness.

9. The folded structure recited in claim 5, wherein the structure is composed as a "four-ply cell structure" of two double-ply folded structures initially made separately as folded-structure-components of which, respectively, the two ply sheets are everywhere joined, wherein the folded structure includes four ply sheets including two inner ply sheets being part of different folded-structure components and mutually facing so as to conjoin both folded-structure components closely tightly so as to form cells enclosing voids between the two folded-structure components.

10. The folded structure recited in claim 9, wherein the folded-structure components are structurally identical, including the array of slit-configurations within their ply sheets, such that the folded structure components are not mirror-inverted to each other, even in respect of the initial material's thickness.

11. An interconnection of elements comprising:
two portions of a folded structure according to claim 1, as relief-elements, interconnected by an interconnecting butt-strap consisting entirely of one plane oblong blank which has been regularly folded to and from, wherein the initially flat oblong blank is subdivided into lined up segments which border one another at fold lines and which have a format of segments of the relief-elements.

12. A sandwich panel comprising a folded structure according to claim 1 as a core layer, and a plane skin layer at least at one side, wherein all surfaces of the H-segments of at least one side of the folded structure, that are surfaces being situated within the plane of the inwards facing surface of the skin layer, are tightly conjoined with the skin layer.

13. A sandwich panel according to claim 12 wherein the core layer includes regularly arranged cells, and both sides of the folded structure include plane skin layers, wherein the skin layers close all recesses within the surface of the core layer and, make of them equally closed cells which form, together with the cells of the core layer, a gapless extensive flat arrangement of voids within the sandwich panel such that not any void extends continuously through the sandwich-panel-core within any directionality in the zero plane, and wherein the core is close-celled all-over.

14. A corner panel of at least two portions of a folded structure that are interconnected according to claim 11 and, have been provided at least unilaterally with a skin-layer, only after having been interconnected, wherein at least two skin layers contact each other without gaps at the intersection line of their planes.

15. A folding process to make a ply sheet of a folded structure according to claim 1, wherein, using a folding tool having a shape of an oblong hollow space to be passed, with a clearance outline changing continuously along the path, a planar blank, is brought into the intended final state of the folding process as a relief-shaped closed ply sheet of a folded structure, wherein, due to its mechanism property as a spatial folding object, folding immediately the blank within transverse direction induces folding also within its longitudinal direction.

16. A folding tool as a spatial stencil for the fabrication according to claim 15 of a ply sheet of a folded structure according to claim 1, the folding tool having a shape of a duct to be passed as a continuously changing folding object by a planar blank, the duct having a very flat and very large clearance outline at its entry and having at its exit a clearance shaped as a silhouette of an elevation view of the completely folded ply sheet seen into the direction of the movement of the blank, wherein the continuous lines of the paths of the set of the emerging convex and concave vertices of this outline each start, and end, as a straight line, and also run continuously, that is, without offsets, folds and abrupt changes of curvature, due to an S-curve interconnecting tangentially both straight lines, whereby warping within the segments of the blank being folded is minimal when passing through the folding tool.

17. A folded structure including the features of claim 1, except instead of being initially an integral whole that has been subdivided into segments during production, the structure is a flat mat assembled everywhere of individually cut-out segments that have been flexibly interconnected at the fold lines by joints or hinges.

* * * * *